United States Patent
Ohtsuka et al.

(10) Patent No.: US 9,971,556 B2
(45) Date of Patent: May 15, 2018

(54) IMAGE PROCESSING APPARATUS, IMAGE PROCESSING METHOD, AND RECORDING MEDIUM

(71) Applicants: Aiko Ohtsuka, Tokyo (JP); Atsushi Funami, Tokyo (JP)

(72) Inventors: Aiko Ohtsuka, Tokyo (JP); Atsushi Funami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/452,887

(22) Filed: Mar. 8, 2017

(65) Prior Publication Data
US 2018/0011669 A1    Jan. 11, 2018

(30) Foreign Application Priority Data

Jul. 5, 2016   (JP) .................................. 2016-133774
Feb. 3, 2017   (JP) .................................. 2017-018970
Mar. 7, 2017   (JP) .................................. 2017-043209

(51) Int. Cl.
*G06F 3/12*     (2006.01)
*H04N 1/00*     (2006.01)

(52) U.S. Cl.
CPC .......... *G06F 3/1268* (2013.01); *G06F 3/1203* (2013.01); *G06F 3/1247* (2013.01); *G06F 3/1285* (2013.01); *H04N 1/00249* (2013.01)

(58) Field of Classification Search
CPC ...... B41J 3/286; G06K 9/00449; B29C 64/40; B29C 64/171; G60J 3/00377; G60J 3/0031
See application file for complete search history.

(56) References Cited

U.S. PATENT DOCUMENTS 6,201,882 B1 *   3/2001   Tanaka .................... G06T 7/80
                                                         382/106
9,501,857 B2    11/2016   Itoh et al.
(Continued)

FOREIGN PATENT DOCUMENTS

JP    2002-328959    11/2002
JP    2017-041089    2/2017
WO   2015/093553    6/2015

OTHER PUBLICATIONS

Anonymous: "Flexify 2 plug-in (version 2.84) used in Adobe Photoshop CS6", Jun. 16, 2016 (Jun. 16, 2016), pp. 1-23, XP055383376, Retrieved from the Internet: URL:http://web.archive.org/web/20160616162642/http://www.flamingpear.com/free-trials.html [retrieved on Jun. 20, 2017] the whole document.

(Continued)

*Primary Examiner* — Moustapha Diaby
(74) *Attorney, Agent, or Firm* — IPUSA, PLLC

(57) ABSTRACT

An image processing apparatus for coupling to an imaging apparatus that generates a captured image covering substantially a 360-degree field of view and for transmitting an output image to an image forming apparatus includes a setting unit configured to select a type of a polyhedron that is to be constructed by folding a development printed on a medium according to the output image, a converter configured to convert coordinates in the captured image into coordinates in the development that is to be printed on the medium and folded to construct the polyhedron, such that a zenith in the captured image is printed at a topmost point of the polyhedron constructed by folding the development printed on the medium, and an image generator configured to generate the output image based on the converted coordinates.

12 Claims, 22 Drawing Sheets

(56) References Cited

U.S. PATENT DOCUMENTS

| | | | |
|---|---|---|---|
| 2005/0089770 A1* | 4/2005 | Liu | G03F 1/34 |
| | | | 430/5 |
| 2014/0085412 A1* | 3/2014 | Hayashi | G06T 11/60 |
| | | | 348/37 |
| 2015/0170335 A1 | 6/2015 | Otsuka et al. | |
| 2017/0039909 A1 | 2/2017 | Itoh et al. | |
| 2017/0150007 A1* | 5/2017 | Snowball | H04N 1/393 |

OTHER PUBLICATIONS

Anonymous: "Free trials—Flaming Pear Software", Jun. 16, 2016 (Jun. 16, 2016), XP055382840, Retrieved from the Internet: URL:http://web.archive.org/web/20160616162642/http://www.flamingpear.com/free-trials.html [retrieved on Jun. 19, 2017] the whole document.

C. A. Furuti: "Map Projections—Polyhedral Maps. Introduction, common projections, tetrahedral globes", Mar. 5, 2016 (Mar. 5, 2016), XP055381824, Retrieved from the Internet: URL:https://web.archive.org/web/20160305093629/http://www.progonos.com/furuti/MapProj/Normal/ProjPoly/projPoly.html [retrieved on Jun. 14, 2017] Sec. "Introduction".

C. A. Furuti: "Map Projections—Polyhedral Maps. Cubic pseudoglobes, gnomonic projection", Mar. 8, 2016 (Mar. 8, 2016), XP055381821, Retrieved from the Internet: URL:https://web.archive.org/web/20160308173631/http://www.progonos.com/furuti/MapProj/Normal/ProjPoly/Foldout/Cube/cube.html [retrieved on Jun. 14, 2017] Sec. "High-Resolution Maps", maps 5, 7, and 8.

C. A. Furuti: "Map Projections—Polyhedral Maps. Icosahedral pseudoglobes, gnomonic projection. Map Projections Resolution—3 Maps", May 21, 2016 (May 21, 2016), XP055381819, Retrieved from the Internet: URL:https://web.archive.org/web/20160521175153/http://www.progonos.com:80/furuti/MapProj/Normal/ProjPoly/projPoly.html [retrieved on Jun. 14, 2017] Sec. "High-Resolution Maps", maps 4, 6, and 7.

Extended European Search Report for 17160014.1 dated Jul. 4, 2017.

* cited by examiner

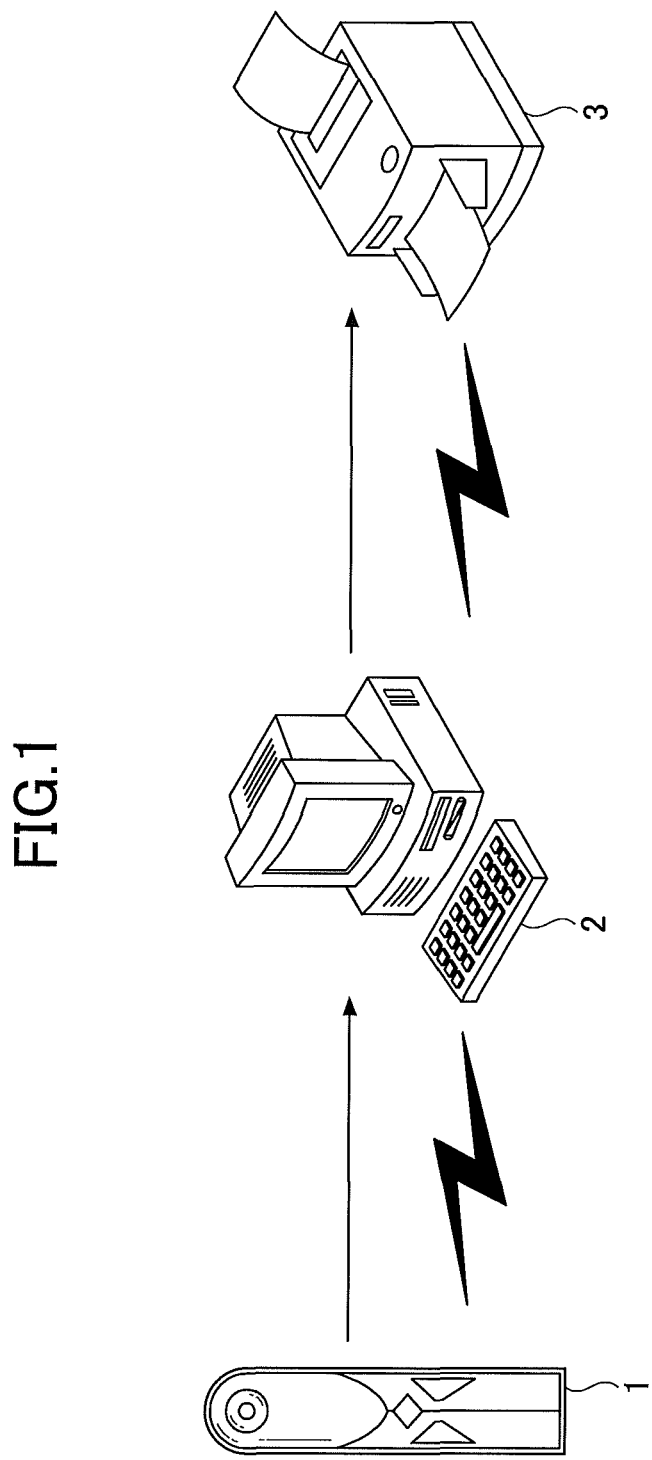

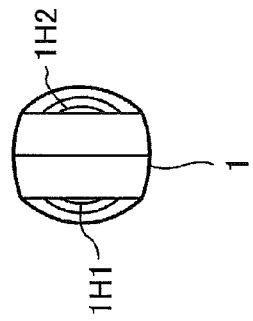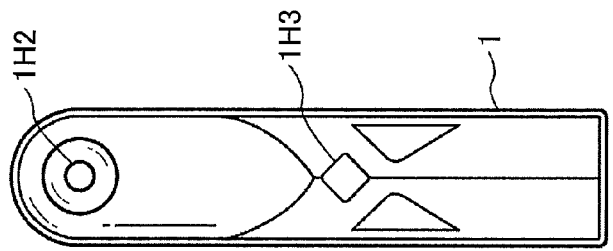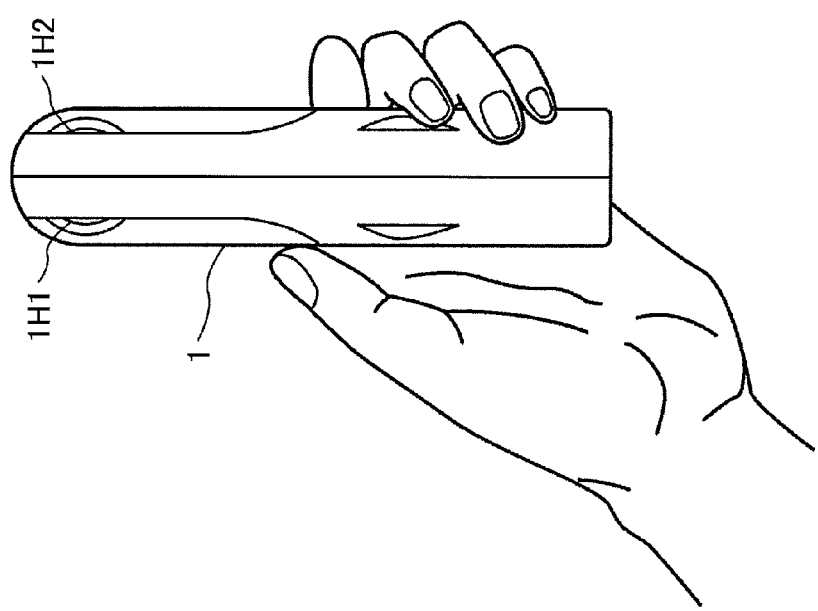

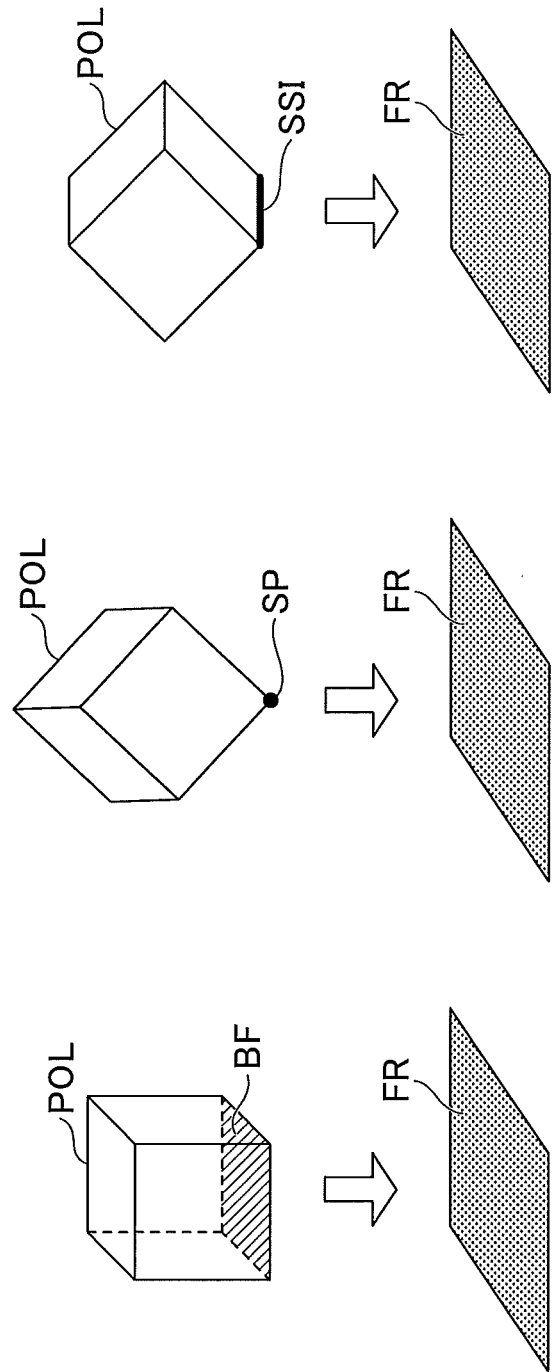

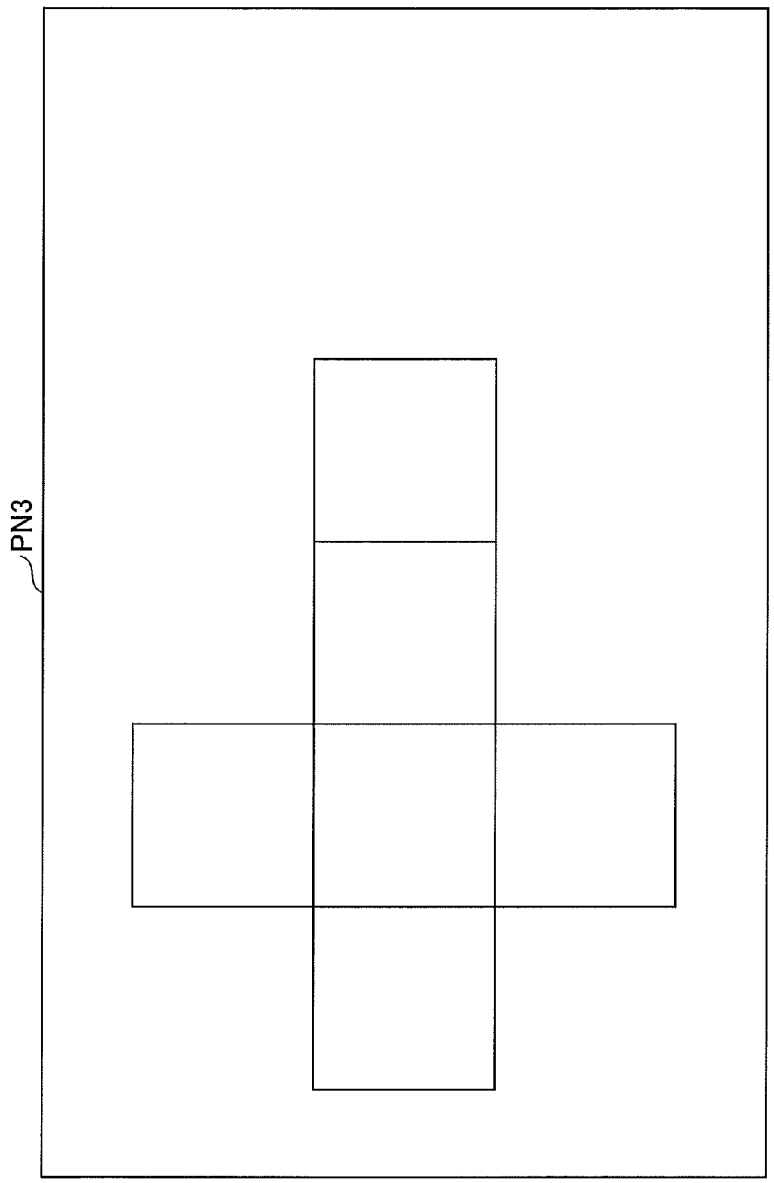

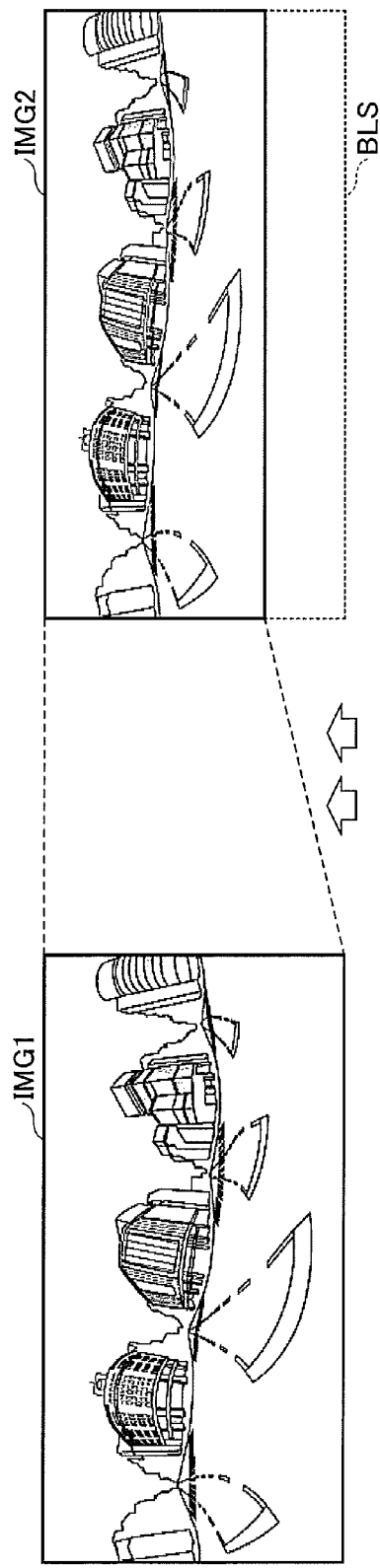

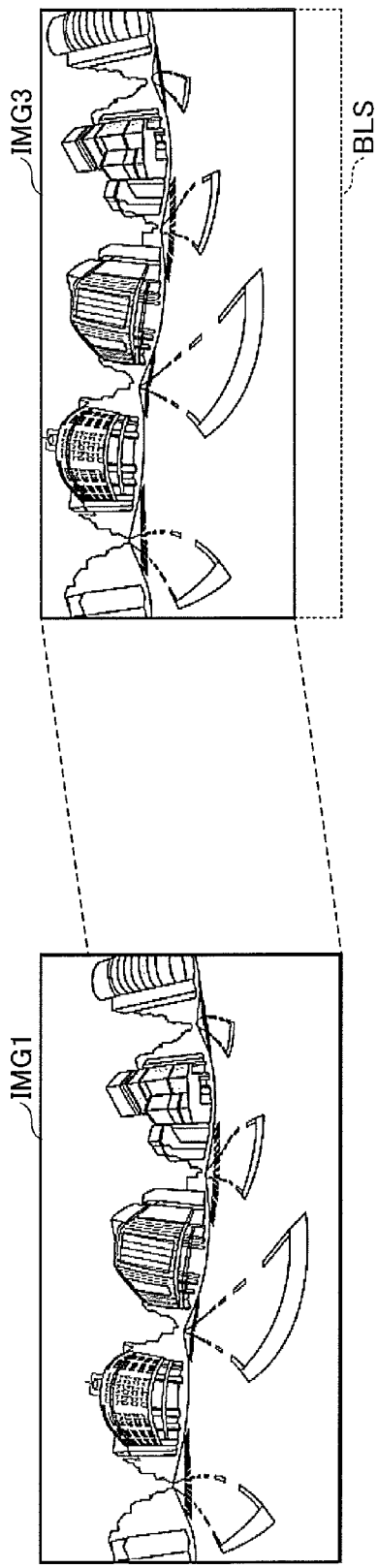

IMAGE PROCESSING APPARATUS, IMAGE PROCESSING METHOD, AND RECORDING MEDIUM

CROSS-REFERENCE TO RELATED APPLICATIONS

The present application claims priority under 35 U.S.C. § 119 to Japanese Patent Applications No. 2016-133774, filed on Jul. 5, 2016, No. 2017-018970, filed on Feb. 3, 2017, and No. 2017-043209, filed on Mar. 7, 2017, the contents of which are incorporated herein by reference in their entirety.

BACKGROUND OF THE INVENTION

1. Field of the Invention

The disclosures herein generally relate to an image processing apparatus, an image processing method, and a recording medium.

2. Description of the Related Art

Methods known in the art for creating a three-dimensional paper model or the like involve printing a development drawing on a two-dimensional paper sheet or the like based on the intended three-dimensional shape, cutting out the development, and then building the model.

For example, a computer may first identify the coordinates of vertexes constituting the three-dimensional shape. The computer next identifies each face constituted by three or more vertexes and associated with these vertexes. The computer then identifies each edge that constitutes one of the edges of two faces adjacent to each other and that is associated with these two adjacent faces. The computer further converts the coordinates of the vertexes constituting a selected one of the two identified adjacent faces into two-dimensional coordinates to develop the selected face, followed by selecting a face to be next developed based on the edges of the developed face. A method for producing a development drawing of a three-dimensional shape in this manner is known in the art (see Patent Document 1, for example).

SUMMARY OF THE INVENTION

In one embodiment, an image processing apparatus for coupling to an imaging apparatus that generates a captured image covering substantially a 360-degree field of view and for transmitting an output image to an image forming apparatus includes a setting unit configured to select a type of a polyhedron that is to be constructed by folding a development printed on a medium according to the output image, a converter configured to convert coordinates in the captured image into coordinates in the development that is to be printed on the medium and folded to construct the polyhedron, such that a zenith in the captured image is printed at a topmost point of the polyhedron constructed by folding the development printed on the medium, and an image generator configured to generate the output image based on the converted coordinates.

BRIEF DESCRIPTION OF THE DRAWINGS

Other objects and further features of embodiments will be apparent from the following detailed description when read in conjunction with the accompanying drawings, in which:

FIG. 1 is a drawing illustrating an example of the usage of an image processing apparatus according to an embodiment;

FIGS. 2A through 2C are drawings illustrating an example of an imaging apparatus according to the embodiment;

FIGS. 11A through 11C are drawings illustrating examples of placement positions displayed by the image processing apparatus according to the embodiment;

FIG. 14 is a drawing illustrating an example of a display screen showing an output image according to the embodiment;

FIG. 18 is a drawing illustrating an example of size reduction of a captured image according to the embodiment;

FIG. 19 is a drawing illustrating an example of a parallel shift of a captured image according to the embodiment;

DESCRIPTION OF THE PREFERRED EMBODIMENTS

Figure 3:
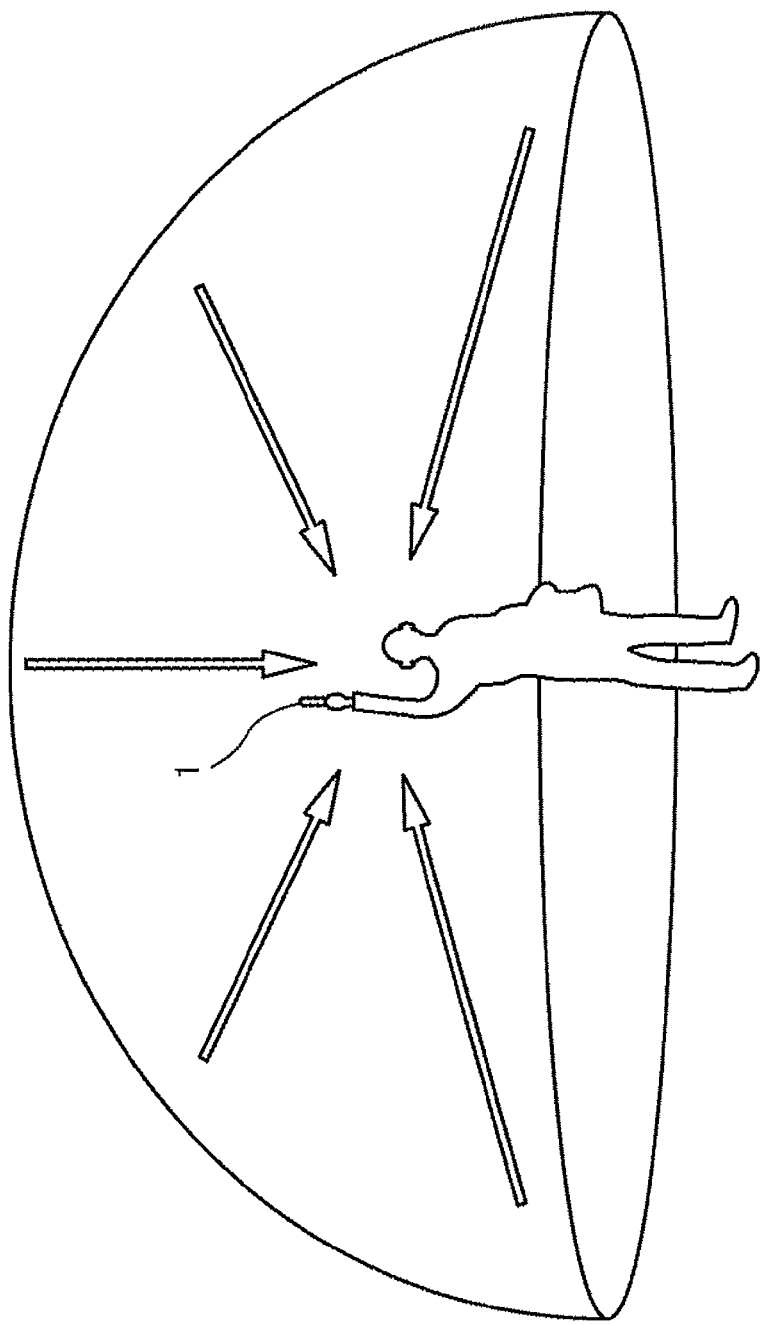
FIG. 3 is a drawing illustrating an example of an imaging operation performed by the imaging apparatus according to the embodiment.

There may be a case in which an image (i.e., captured image) taken by an imaging device such as an omnidirectional camera is printed on a paper sheet or the like, followed by folding the sheet having the image printed thereon to a polyhedron shape. When a conventional method is used in such a case, the topmost point of the polyhedron may not coincide with the zenith of the captured image.

It may be an object of embodiments of the present disclosures to provide an image processing apparatus for which a polyhedron produced by folding a paper sheet or the like having a captured image printed thereon has the topmost point thereof corresponding to the zenith of the captured image.

In the following, a description will be given of embodiments of the present invention.

<Examples of Usage of Image Processing Apparatus>

FIG. 1 is a drawing illustrating an example of the entire configuration of an image processing system according to an embodiment. In the illustrated example of the image processing system, an omnidirectional camera 1 serving as an example of an imaging apparatus is coupled to a PC (personal computer) 2 serving as an example of image processing apparatus. Further, the PC 2 is coupled to a printer 3 serving as an example of an image forming apparatus.

The omnidirectional camera 1 may be a camera having a plurality of optical systems, for example. The omnidirectional camera 1 produce a captured image covering a large visual field such as the entire sphere around the omnidirectional camera 1 based on images captured by the plurality of optical systems. Such a captured image may cover a 360-degree field of view in the horizontal plane, for example.

The captured image is not limited to an image showing the full 360 degrees. The captured image may be an image covering a limited portion of the full 360 degrees, an image covering a hemisphere, or may be an image having a portion thereof being removed.

The omnidirectional camera 1 supplies a captured image to the PC 2. The PC 2 processes the captured image to produce an output image. As the PC supplies an output image to the printer 3, the printer 3 forms an image on a medium such as a paper or plastic sheet or the like based on the output image.

The printed image is cut out of the paper sheet or the like having the image formed thereon. The cut-out sheet is then folded to construct a polyhedron such as a tetrahedron, a hexahedron, an octahedron, a dodecahedron, an icosahedron, a cylinder, a cone or pyramid, or a prism. The polyhedron is not limited to these shapes, and may have any shape.

In the example, the omnidirectional camera 1, the PC 2, and the printer 3 are coupled through a wired connection or a wireless connection. The PC 2 may download from the omnidirectional camera 1 the data of a captured image such as a full-sphere image produced by the omnidirectional camera 1. The connection may alternatively be provided through a network or through an intervening server, for example.

The configuration that the image processing apparatus utilizes is not limited to the configuration illustrated in FIG. 1. For example, the omnidirectional camera 1 and the PC 2 may be implemented as a single consolidated apparatus. The image processing apparatus is not limited to a PC, and may be any type of image processing apparatus.

The apparatuses used in this system may be as follows.

<Example of Imaging Apparatus>

FIGS. 2A through 2C are drawings illustrating an example of the imaging apparatus according to the embodiment. FIGS. 2A through 2C illustrate an example of the outer appearance of the omnidirectional camera 1. Specifically, FIG. 2A illustrates an example of the front view of the omnidirectional camera 1. FIG. 2B illustrates a left side elevation view of the omnidirectional camera 1. FIG. 2C illustrates an example of the plan view of the omnidirectional camera 1.

The omnidirectional camera 1 includes a front-face imaging device 1H1, a rear-face imaging device 1H2, and a switch 1H3. In this example, the optical systems of the front-face imaging device 1H1 and the rear-face imaging device 1H2 are used to take a picture. Based on the images captured by use of these optical systems, the omnidirectional camera 1 produces a captured image covering the full sphere, for example.

The switch 1H3 is a shutter button, which is an example of an input device that is used by a user to instruct the omnidirectional camera 1 to take a picture.

As illustrated in FIG. 2A, for example, the user holds the omnidirectional camera 1 in his/her hand. As the user presses the switch 1H3 of the omnidirectional camera 1, the omnidirectional camera 1 takes a picture. Specifically, the omnidirectional camera 1 is used in an imaging operation as illustrated in FIG. 3.

FIG. 3 is a drawing illustrating an example of an imaging operation performed by the imaging apparatus according to the embodiment. The user, who holds the omnidirectional camera 1 in his/her hand, presses the switch 1H3 illustrated in FIG. 2B to perform an imaging operation. As illustrated, the omnidirectional camera 1 uses the front-face imaging device 1H1 (FIG. 2) and the rear-face imaging device 1H2 (FIG. 2) to capture an image covering a broad visual range such as the full 360 degrees around the omnidirectional camera 1. The image captured in this manner may be as follows.

Figure 4C:
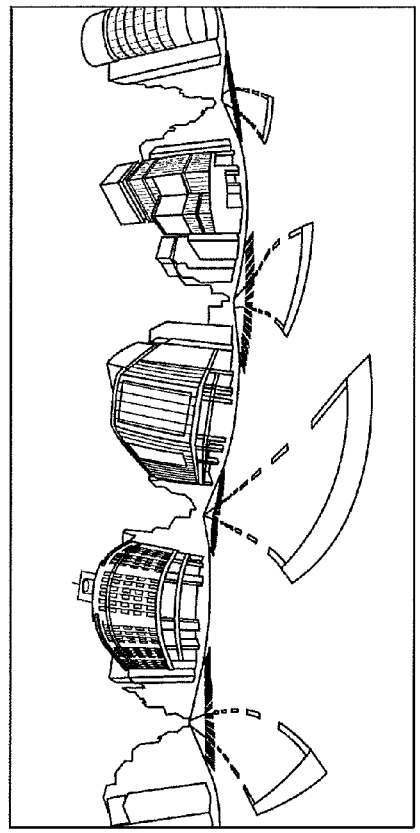
FIGS. 4A through 4C are drawings illustrating examples of images captured by the imaging apparatus according to the embodiment.
Figure 4A:
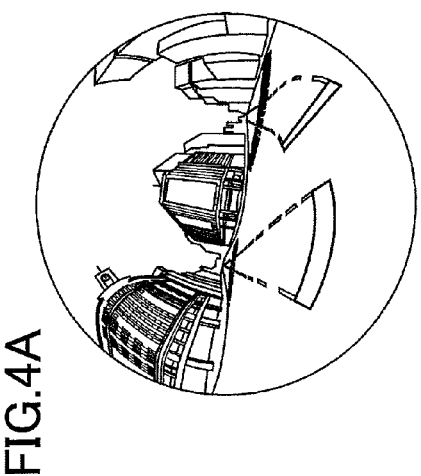
Figure 4B:
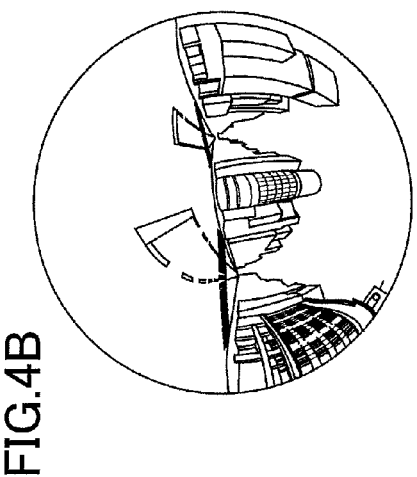

FIGS. 4A through 4C are drawings illustrating examples of images captured by the imaging apparatus according to the embodiment. Specifically, FIG. 4A illustrates an example of an image captured by the front-face imaging device 1H1 (see FIGS. 2A and 2C). FIG. 4B illustrates an example of an image captured by the rear-face imaging device 1H2 (see FIGS. 2A through 2C). FIG. 4C illustrates an example of an image generated from the image captured by the front-face imaging device 1H1 (i.e., the image illustrated in FIG. 4A) and the image captured by the rear-face imaging device 1H2 (i.e., the image illustrated in FIG. 4B).

The image captured by the front-face imaging device 1H1 covers a wide field of view, for example, a view angle of 180 degrees, in front of the omnidirectional camera 1 as illustrated in FIG. 4A. As illustrated, the image captured by the front-face imaging device 1H1 has distortion in the case of the front-face imaging device 1H1 employing an optical system for covering a wide visual field, e.g., employing a fisheye lens. Namely, the image illustrated in FIG. 4A is a hemisphere image having distortion and covering a broad visual field on one side of the omnidirectional camera 1.

The view angle of each optical system may preferably be larger than or equal to 180 degrees and lower than or equal to 200 degrees. In the case of the view angle exceeding 180 degrees, the hemisphere image illustrated in FIG. 4A and the hemisphere image illustrated in FIG. 4B have overlapping image areas. When these images are to be stitched with each other, the imaging apparatus is able to perform stitching by utilizing such overlapping image areas, which makes it easier to produce a full-sphere image.

The image captured by the rear-face imaging device 1H2 covers a wide field of view, for example, a view angle of 180 degrees, in rear of the omnidirectional camera 1 as illustrated in FIG. 4B. In this manner, the image captured by the rear-face imaging device 1H2 is a hemisphere image similar to the image illustrated in FIG. 4A.

The omnidirectional camera 1 performs distortion correction and image stitching to produce the captured image illustrated in FIG. 4C from the front-side hemisphere image illustrated in FIG. 4A and the rear-side hemisphere image illustrated in FIG. 4B. Namely, the image illustrated in FIG. 4C is an example of the captured image generated by utilizing Mercator projection, equidistant cylindrical projection, or the like. In this manner, the captured image is preferably an image covering a wide view angle obtained by use of an omnidirectional camera, a wide-angle lens camera, or the like, as illustrated in FIG. 4C.

The above-noted example is directed to a case in which the user presses the switch 1H3 to control a shutter-button operation. Alternatively, the shutter button may be remotely controlled by a display apparatus such as the PC 2.

<Example of Hardware Configuration of Imaging Apparatus>

Figure 5:
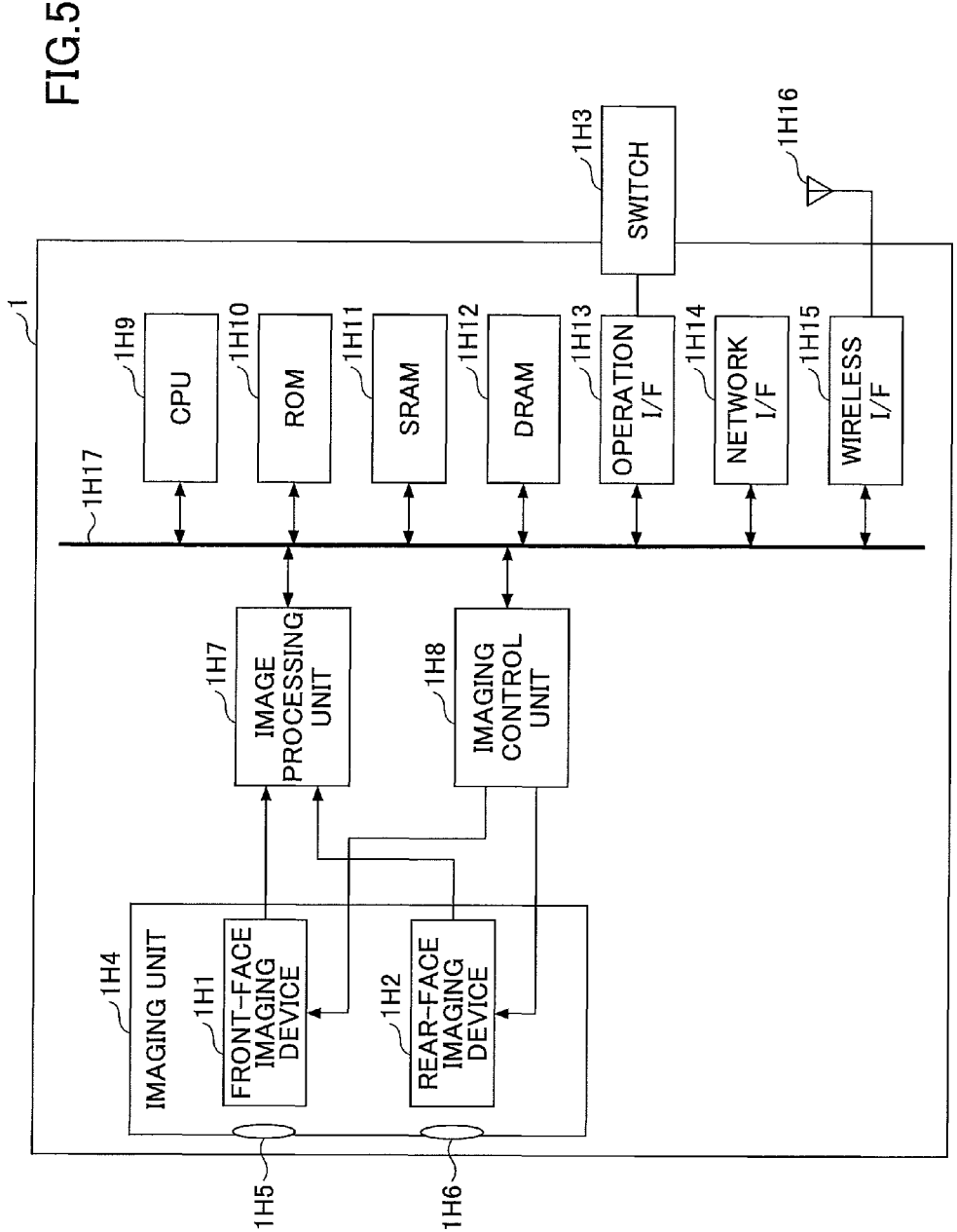
FIG. 5 is a block diagram illustrating an example of the hardware configuration of the imaging apparatus according to the embodiment.

FIG. 5 is a block diagram illustrating an example of the hardware configuration of the imaging apparatus according to the embodiment. As illustrated in FIG. 5, the omnidirectional camera 1 includes an imaging unit 1H4, an image processing unit 1H7, an imaging control unit 1H8, a CPU (central processing unit) 1H9, and a ROM (read-only memory) 1H10. The omnidirectional camera 1 further includes an SRAM (static random access memory) 1H11, a DRAM (dynamic random access memory) 1H12, and an operation I/F (interface) 1H13. The omnidirectional camera 1 further includes a network I/F 1H14, a wireless I/F 1H15, and an antenna 1H16. The hardware units of the omnidirectional camera 1 are coupled to each other through a bus 1H17, and receive or transmit data and/or signals through the bus 1H17.

The imaging unit 1H4 includes the front-face imaging device 1H1 and the rear-face imaging device 1H2. A lens 1H5 and a lens 1H6 are disposed in one-to-one correspondence with the front-face imaging device 1H1 and the rear-face imaging device 1H2, respectively.

The front-face imaging device 1H1 and the rear-face imaging device 1H2 are camera units. Specifically, each of the front-face imaging device 1H1 and the rear-face imaging device 1H2 includes an optical sensor such as a CMOS (complementary metal oxide semiconductor) or a CCD (charge coupled device). The front-face imaging device 1H1 converts incident light entering through the lens 1H5 into image data indicative of a hemisphere image or the like. Similarly, the rear-face imaging device 1H2 converts incident light entering through the lens 1H6 into image data indicative of a hemisphere image or the like.

The imaging unit 1H4 then supplies to the image processing unit 1H7 the image data generated by the front-face imaging device 1H1 and the image data generated by the rear-face imaging device 1H2. The supplied image data may represent the front-side hemisphere image illustrated in FIG. 4A and the rear-side hemisphere image illustrated in FIG. 4B, for example.

The front-face imaging device 1H1 and the rear-face imaging device 1H2 may further include additional optical elements such as a diaphragm and/or a low-pass filter in addition to the lens for the purpose of capturing high-quality images. Moreover, the front-face imaging device 1H1 and the rear-face imaging device 1H2 may perform defective-pixel correction, image stabilization, and the like for the purpose of capturing high-quality images.

The image processing unit 1H7 produces a full-sphere image as illustrated in FIG. 4C based on the image data supplied from the imaging unit 1H4. The process of producing a full-sphere image will be described later.

The imaging control unit 1H8 is a control device for controlling the hardware of the omnidirectional camera 1.

The CPU 1H9 serves as an arithmetic device for performing arithmetic operations and data processing for required processes, and also serves as a control device for controlling hardware. For example, the CPU 1H9 performs processing based on the programs that are installed in advance.

The ROM 1H10, the SRAM 1H11, and the DRAM 1H12 are examples of memory devices. Specifically, the ROM 1H10 stores programs, data, parameters, and/or the like for causing the CPU 1H9 to perform processing, for example. The SRAM 1H11 and the DRAM 1H12 store programs for causing the CPU 1H9 to perform processing based on the programs, and also store data used by the programs, data generated by the programs, etc., for example. The omnidirectional camera 1 may further include an auxiliary memory device such as a hard-disk drive.

The operation I/F 1H13, which is coupled to an input device such as the switch 1H3, serves as an interface for receiving an instruction from the user operating on the omnidirectional camera 1. The operation I/F 1H13 may be an input device such as a switch, a connector and/or cable for coupling an input device, a circuit for processing signals supplied from the input device, a driver, a control device, etc. The operation I/F 1H13 may further include an output device such as a display. The operation I/F 1H13 may be a touchscreen panel serving as both an input device and an output device. The operation I/F 1H13 may include an interface such as a USB (universal serial bus) to couple a memory medium such as a flash memory to the omnidirectional camera 1. With such an arrangement, the operation I/F 1H13 may allow the omnidirectional camera 1 to exchange data with the memory medium.

The operation I/F 1H13 may include a power switch or a parameter inputting switch for operations other than the shutter operation.

The network I/F 1H14, the wireless I/F 1H15, and the antenna 1H16 allow the omnidirectional camera 1 to be coupled to an external apparatus through a wired or wireless connection. The omnidirectional camera 1 may be coupled to a network through the network I/F 1H14 to transmit data to the PC 2 (see FIG. 2). The network I/F 1H14, the wireless I/F 1H15, and the antenna 1H16 may be hardware for coupling to another external apparatus through a wired connection such as a USB. Namely, the network I/F 1H14, the wireless I/F 1H15, and the antenna 1H16 may be a connector, a cable, or/and the like.

The bus 1H17 is used to exchange data between the hardware units of the omnidirectional camera 1. The bus 1H17 is an internal bus. Specifically, the bus 1H17 may be a PCI Express (peripheral component interconnect bus express) or the like.

The omnidirectional camera 1 is not limited to the configuration having two imaging devices. The omnidirectional camera 1 may have three or more imaging devices. The omnidirectional camera 1 may change the viewing direction of a single imaging device to capture a plurality of partial images. The optical systems of the omnidirectional camera 1 are not limited to the configuration using a fisheye lens. A wide-angle lens may alternatively be used.

Processing performed in the omnidirectional camera 1 may alternatively be performed by another device. For example, part or all of the processing may be performed by the PC 2 or another information processing apparatus coupled through the network upon transmitting data, parameters, and the like from the omnidirectional camera 1. In this manner, the image processing system may include a plurality of information processing apparatuses for performing distributed processing in a redundant or parallel manner.

<Example of Hardware Configuration of Image Processing Apparatus>

Figure 6:
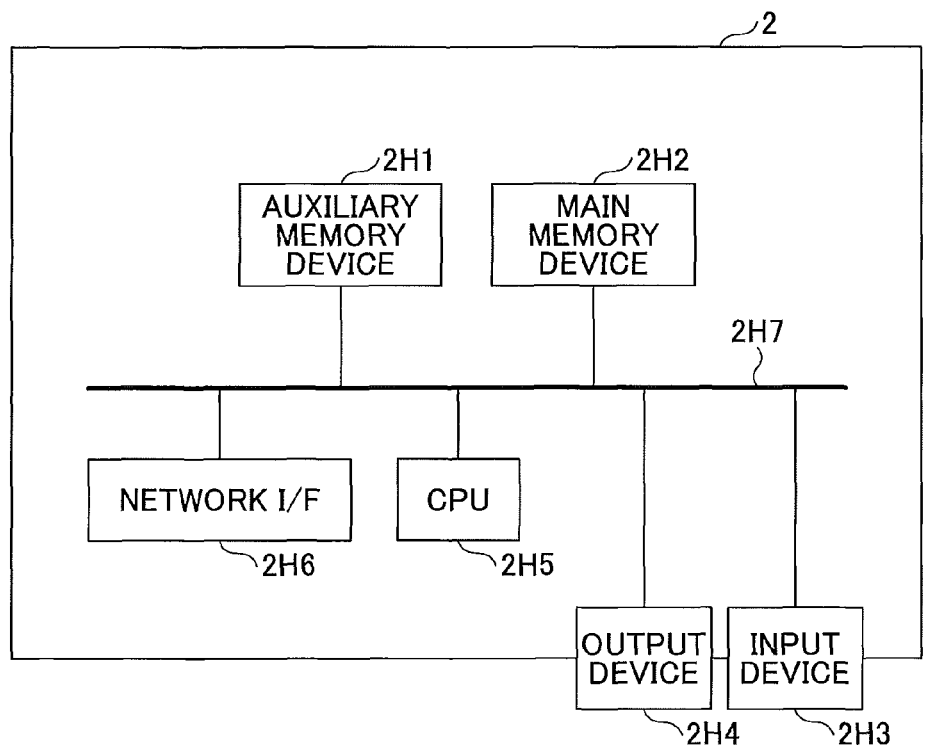
FIG. 6 is a block diagram illustrating an example of the hardware configuration of the image processing apparatus according to the embodiment.

FIG. 6 is a block diagram illustrating an example of the hardware configuration of the image processing apparatus according to the embodiment. As illustrated in FIG. 6, the PC 2 serving as an example of an image processing apparatus includes an auxiliary memory device 2H1, a main memory device 2H2, an input device 2H3, an output device 2H4, a CPU 2H5, and a network I/F 2H6. The hardware units of the PC 2 are coupled to each other through a bus 2H7, and receive or transmit data and/or signals through the bus 2H7.

The auxiliary memory device 2H1 stores data, parameters, programs, and/or the like. Specifically, the auxiliary memory device 2H1 may be a hard-disc drive, a flash SSD (solid state drive), or the like. The data stored in the auxiliary memory device 2H1 may be stored partially or entirely in a file server or the like coupled through the network I/F 2H6 in a redundant manner, or alternatively in a proxy fashion.

The main memory device 2H2 serves as a work memory providing a memory area used by programs for performing processing. The main memory device 2H2 stores data, programs, parameters, and/or the like. Specifically, the main memory device 2H2 may be an SRAM or a DRAM, for example. The main memory device 2H2 may further include a control device for write and read operations.

The input device 2H3 serves to receive an instruction from a user operating the input device 2H3, and may also serve as an output device for displaying images, processed data, and/or the like. Specifically, the input device 2H3 may be an input device such as a keyboard and mouse. The input device 2H3 may receive an instruction from a user operating on a GUI (graphical user interface) or the like displayed thereon.

The output device 2H4 may be a display or the like for displaying images, processed data, and/or the like to a user. The input device 2H3 and the output device 2H4 may be implemented as a single consolidated device such as a touchscreen panel.

The CPU 2H5 serves as an arithmetic device for performing arithmetic operations and data processing for required processes, and also serves as a control device for controlling hardware. The CPU 2H5 may include a plurality of CPUs, devices, or cores for performing parallel, redundant, or distributed processing. The PC 2 may further include an auxiliary device for processing such as a GPU (graphical processing unit) in the inside or outside thereof.

The network I/F 2H6 is coupled to an external apparatus through a network in a wired or wireless manner. Specifically, the network I/F 2H6 may be an antenna, a peripheral circuit, a driver, and the like for transmitting and receiving data and/or the like. For example, the PC 2 uses the CPU 2H5 and the network I/F 2H6 to receive image data from the omnidirectional camera 1 (see FIG. 1) or the like. The PC 2 uses the CPU 2H5 and the network I/F 2H6 to transmit data and/or the like to the omnidirectional camera 1 or the like.

The image processing apparatus is not limited to a PC. Namely, the image processing apparatus may be a computer other than a PC. For example, the image processing apparatus may be a smartphone, a PDA (personal digital assistance), a tablet, a portable phone, or the like, or a combination thereof. The image processing apparatus may not be limited to a single apparatus, and may be implemented as a plurality of apparatuses.

<Example of Captured Image>

Figure 7A:
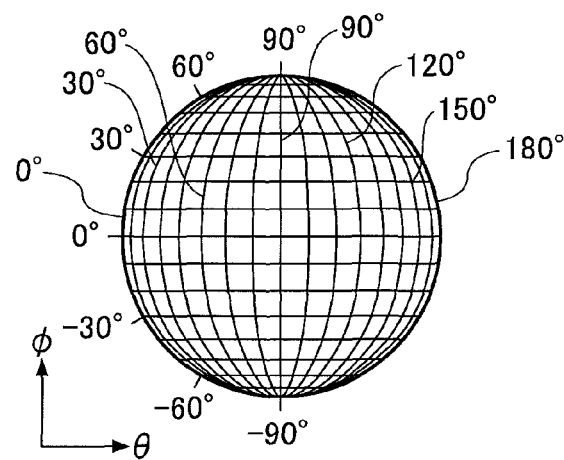
FIGS. 7A through 7D are drawings illustrating examples of captured images according to the embodiment.
Figure 7B:
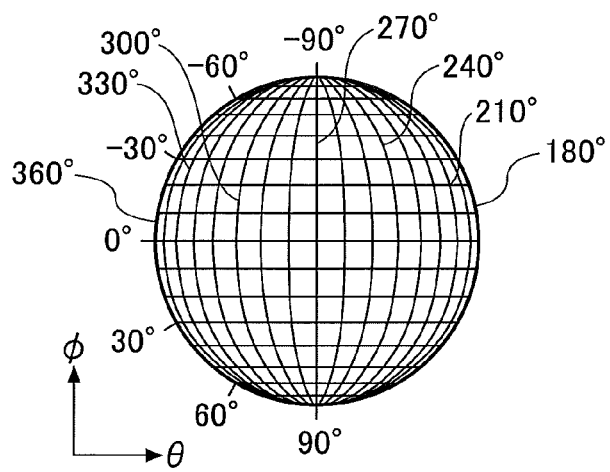

FIGS. 7A through 7D are drawings illustrating examples of captured images according to the embodiment. FIGS. 7A through 7D illustrate an example of generating a captured image from hemisphere images as illustrated in FIG. 7A and FIG. 7B. FIG. 7A illustrates lines joining points of the same incident angles relative to the optical axis as defined in the horizontal direction and in the vertical direction in the hemisphere image illustrated in FIG. 4A. An incident angle relative to the optical axis as defined in the horizontal direction will hereinafter be referred to as "θ". An incident angle relative to the optical axis as defined in the vertical direction will hereinafter be referred to as "φ". Similarly to FIG. 7A, FIG. 7B illustrates lines joining points of the same incident angles relative to the optical axis as defined in the horizontal direction and in the vertical direction in the hemisphere image illustrated in FIG. 4B.

Figure 7C:
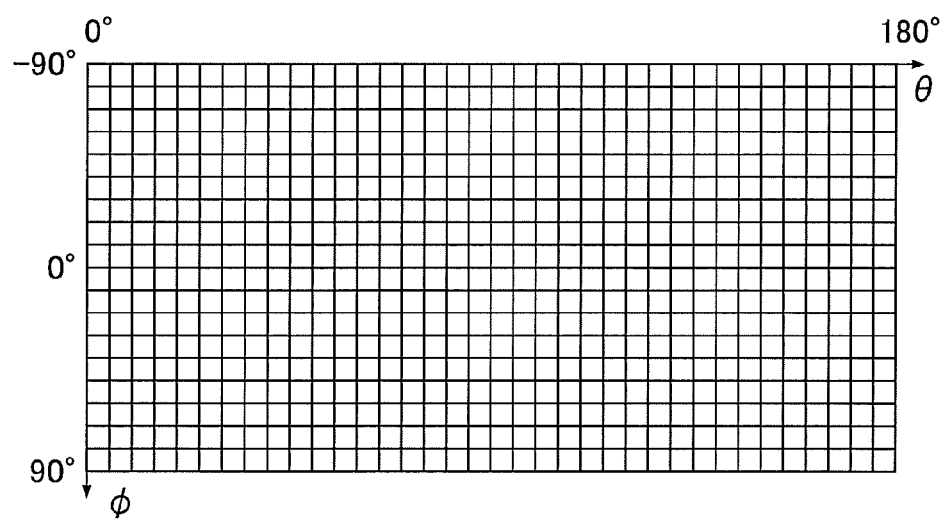
Figure 7D:
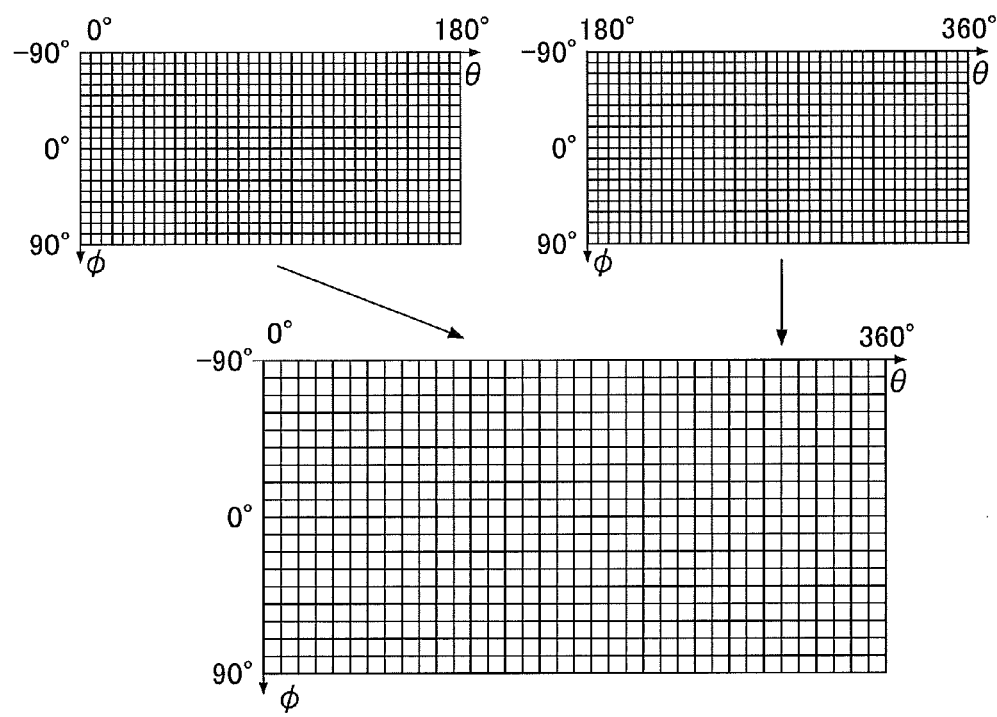

FIG. 7C illustrates an example of an image generated through Mercator projection. Specifically, the image illustrated in FIG. 7C is generated through equidistant cylindrical projection from the image illustrated in FIG. 7A or FIG. 7B by making a conversion by use of a LUT (i.e., look-up table) or the like prepared in advance. After the images are converted into the state as illustrated in FIG. 7C, these images are combined (stitched) as illustrated in FIG. 7D, thereby generating a full-sphere image by use of the imaging apparatus. In this manner, a stitching process (combining process) uses two or more hemisphere images in the state as illustrated in FIG. 7C to generate a full-sphere image. The stitching process is not limited to the process of simply arranging the hemisphere images in the state as illustrated in FIG. 7C continuously to each other as illustrated in FIG. 7D. For example, the center of the full-sphere image in the horizontal direction may be at an angle θ different from 180 degrees. In such a case, the imaging apparatus performs preprocessing on the hemisphere image illustrated in FIG. 4A, and then places the preprocessed image at the center of the full-sphere image frame. The imaging apparatus then divides the preprocessed image of the hemisphere image illustrated in FIG. 4B to generate images having suitable sizes to be arranged on the either side of the center image, followed by combining (stitching) the images to produce a full-sphere image as illustrated in FIG. 5D.

It may be noted that the process of generating a full-sphere image is not limited to the process involving equidistant cylindrical projection. For example, the arrangement of pixels of the hemisphere image illustrated in FIG. 7B may be vertically reverse, in the φ direction, to the arrangement of pixels of the hemisphere image illustrated in FIG. 7A, and the arrangements of pixels of these images may also be horizontally reverse to each other in the θ direction. With images in such a reversed state, the imaging device may perform 180-degree rotation as preprocessing in order to align the hemisphere image of FIG. 7B with the arrangements of pixels in the φ direction and in the θ direction of the image illustrated in FIG. 7A.

The process of generating a full-sphere image may include distortion correction or the like for correcting distortion with respect to the hemisphere images illustrated in FIG. 7A and FIG. 7B. Further, the process of generating a full-sphere image may include shading correction, gamma correction, white balance adjustment, image stabilization, optical-black correction, defective-pixel correction, edge enhancement, linear correction, etc. In the case of an overlapping area being in existence between the visual field of one hemisphere image and the visual field of another hemisphere image, the combining process may apply correction by utilizing the pixels of an object captured in the overlapping visual field, thereby combining the hemisphere images with high precision.

Performing the processes as described above for generating a full-sphere image, the omnidirectional camera 1 produces a full-sphere image from a plurality of captured hemisphere images. Different processes may alternatively be employed to generate a full-sphere image.

<Example of Processing of Image Processing Apparatus>

Figure 8:
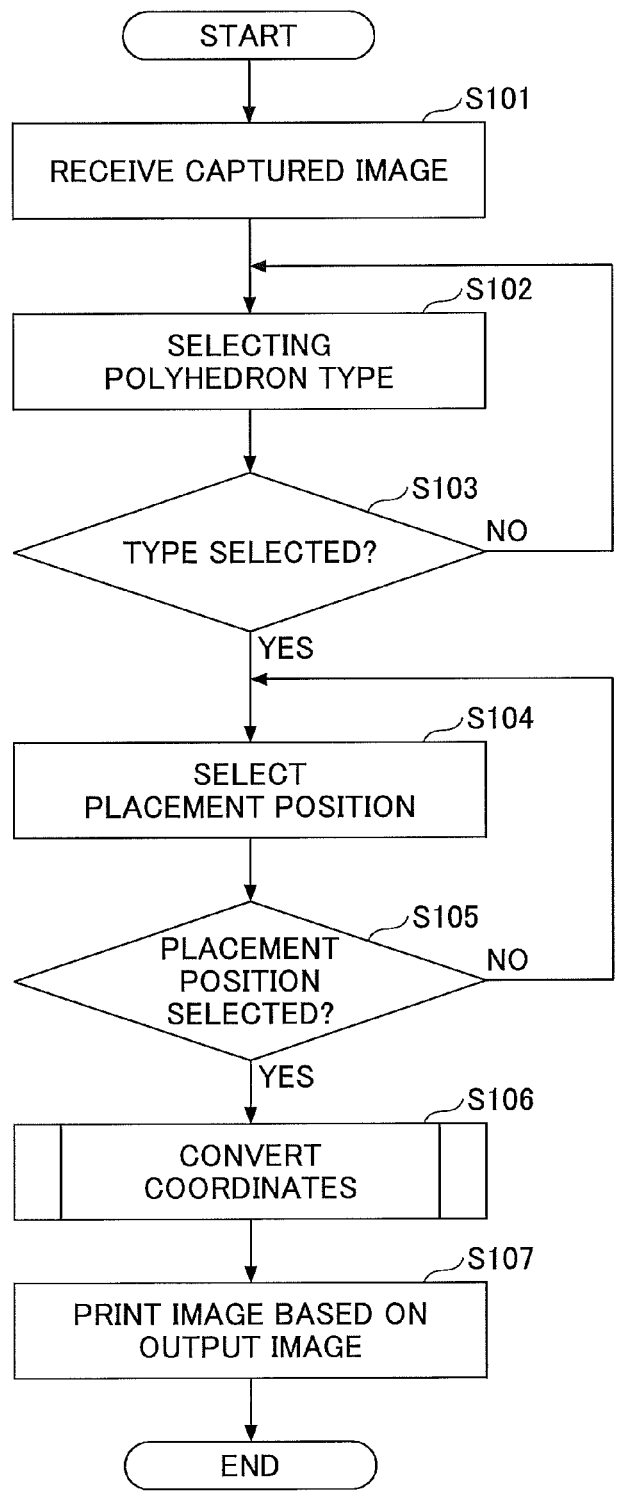
FIG. 8 is a flowchart illustrating an example of entire processing performed by the image processing apparatus according to the embodiment.

FIG. 8 is a flowchart illustrating an example of entire processing performed by the image processing apparatus according to the embodiment. The PC 2 illustrated in FIG. 1 may perform the processing illustrated in FIG. 8.

<Example of Acquisition of Captured Image>

In step S101, the PC 2 acquires a captured image. For example, the processes performed by the omnidirectional camera as illustrated in FIGS. 7A through 7D generate a captured image covering a full sphere or the like. As illustrated in FIG. 1, the omnidirectional camera 1 transmits the captured image to the PC 2, so that the PC 2 obtains the captured image.

<Example of Setting Type of Polyhedron>

In step S102, the PC 2 sets a type of a polyhedron. For example, the PC 2 displays a setting screen to a user, and receives an instruction from the user to select a type of a polyhedron.

Figure 9:
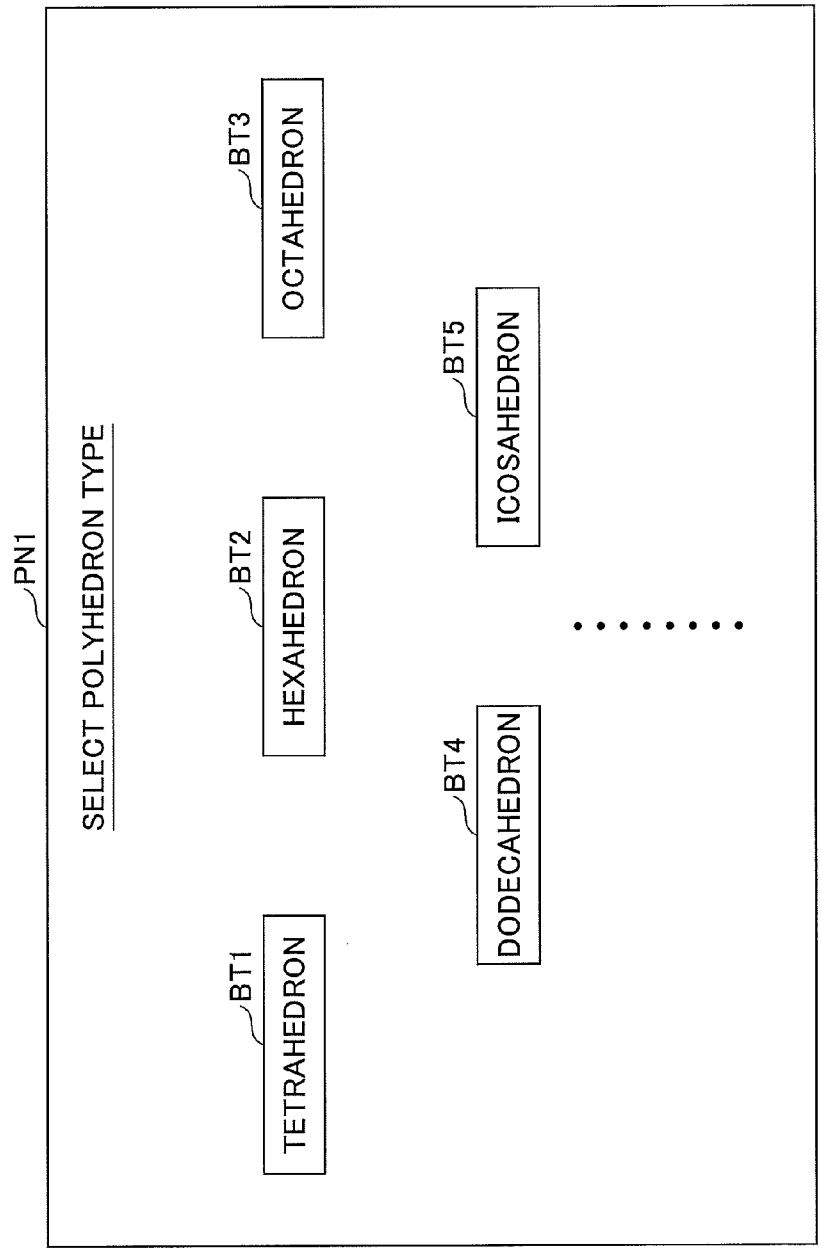
FIG. 9 is a drawing illustrating an example of a polyhedron-type setting screen displayed by the image processing apparatus according to the embodiment.

FIG. 9 is a drawing illustrating an example of a polyhedron-type setting screen displayed by the image processing apparatus according to the embodiment. In step S102, for example, the PC 2 displays a first setting screen PN1 as illustrated in FIG. 9.

In the example illustrated in FIG. 9, the first setting screen PN1 presents a GUI for allowing an operation to be performed to select a polyhedron. Specifically, the GUI may include a first button BT1, a second button BT2, a third button BT3, a fourth button BT4, and a fifth button BT5. More specifically, the user may press the first button BT1 to select the tetrahedron. Likewise, the user may press the second button BT2 to select the hexahedron. In this manner, a GUI such as the first button BT1, the second button BT2, the third button BT3, the fourth button BT4, and the fifth button BT5 is used to allow a user instruction selecting a type of a polyhedron to be entered into the PC.

By referring to FIG. 8 again, in step S103, the PC 2 checks whether a type of a polyhedron has been selected. Upon determining that a type of a polyhedron has been selected (YES in step S103), the PC 2 proceeds to step S104. Upon determining that a type of a polyhedron has not been selected (NO in step S103), the PC 2 proceeds to step S102.

<Example of Setting Placement Position>

In step S104, the PC 2 sets the placement position of the polyhedron. For example, the PC 2 displays a setting screen to a user, and receives an instruction from the user to select the placement position of the polyhedron.

Figure 10:
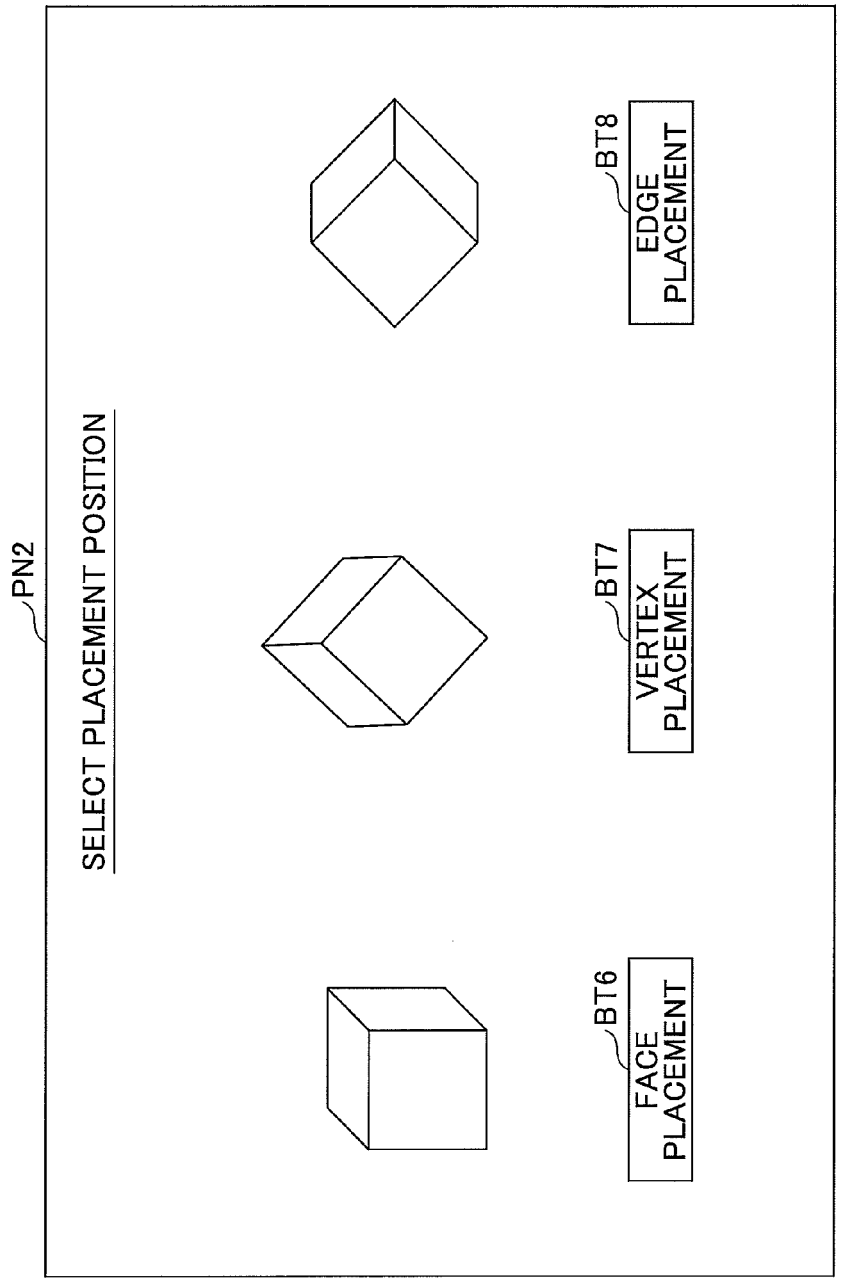
FIG. 10 is a drawing illustrating an example of a placement-position setting screen displayed by the image processing apparatus according to the embodiment.

FIG. 10 is a drawing illustrating an example of a placement-position setting screen displayed by the image processing apparatus according to the embodiment. In step S104, for example, the PC 2 displays a second setting screen PN2 as illustrated in FIG. 10. The second setting screen PN2 illustrated in FIG. 10 is an example of a screen for displaying three types of placement positions. The placement positions include the three types as follows. The following description will be directed to an example in which the hexahedron has been selected as a polyhedron type.

FIGS. 11A through 11C are drawings illustrating examples of placement positions displayed by the image processing apparatus according to the embodiment. FIG. 11A illustrates an example of placement position in which one of the plurality of faces of a polyhedron POL is in contact with the ground. The placement position as illustrated in FIG. 11A will hereinafter be referred to as "face placement". As shown in the illustration, the "face placement" refers to the case in which, when the polyhedron POL is placed on a floor FR, a portion of the polyhedron POL coming in contact with the floor FR is a face. The face coming at the bottom when the polyhedron POL is placed on the floor FR will hereinafter be referred to as a "bottom face BF". The bottom face BF is the face that has the image formed thereon concealed when the polyhedron POL is placed on the floor FR.

FIG. 11B illustrates an example of placement position in which one of the plurality of vertexes of a polyhedron POL is in contact with the ground. The placement position as illustrated in FIG. 11B will hereinafter be referred to as "vertex placement". As illustrated in FIG. 11B, for example, this placement position is such that one of the plurality of vertexes of the polyhedron POL comes in contact with the ground (such a vertex will hereinafter be referred to as a "supporting point SP"). A rod or the like may be disposed beneath the supporting point SP so as to support the polyhedron POL. As shown in the illustration, the "vertex placement" refers to the case in which, when the polyhedron POL is placed on a floor FR, a portion of the polyhedron POL coming in contact with the floor FR or the like is a vertex.

FIG. 11C illustrates an example of placement position in which one of the plurality of edges of a polyhedron POL is in contact with the ground. The placement position as illustrated in FIG. 11C will hereinafter be referred to as "edge placement". As shown in the illustration, the "edge placement" refers to the case in which, when the polyhedron POL is placed on a floor FR, a portion of the polyhedron POL coming in contact with the floor FR is an edge. The edge coming at the bottom when the polyhedron POL is placed on the floor FR will hereinafter be referred to as a "bottom edge SSl". As illustrated in FIG. 11C, the bottom edge SSl comes in contact with the ground in the case of edge placement.

Use of different placement positions causes the positions of the topmost point to differ even when the same polyhedron is used. The topmost point may change as follows depending on the placement position.

Figure 12C:
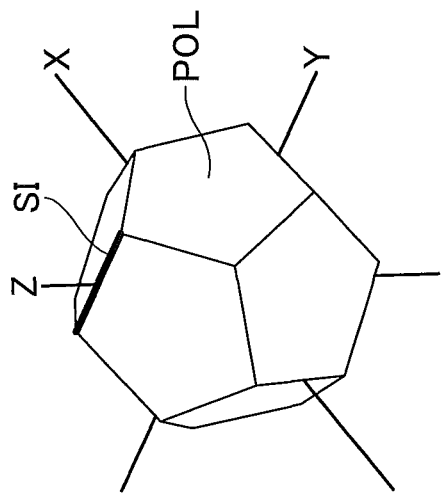
FIGS. 12A through 12C are drawings illustrating examples of topmost points of a polyhedron according to the embodiment.
Figure 12B:
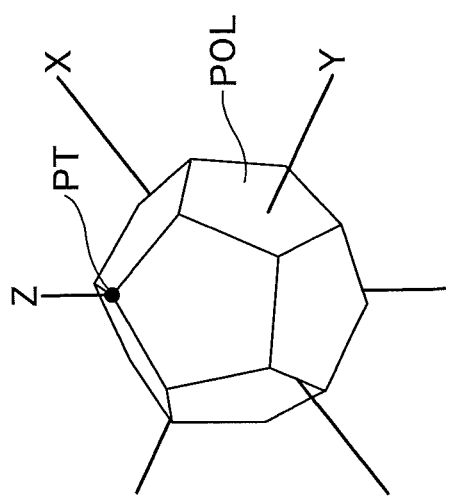
Figure 12A:
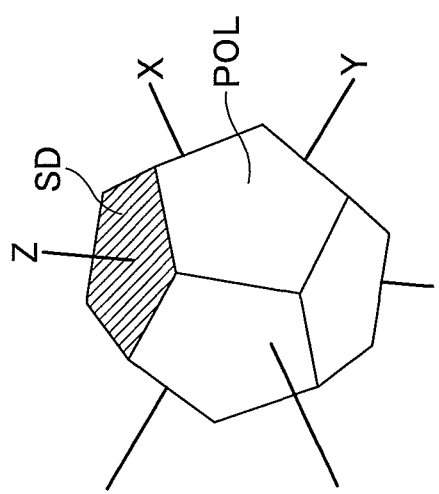

FIGS. 12A through 12C are drawings illustrating examples of topmost points of a polyhedron according to the embodiment. In the case of a polyhedron being disposed in the "face placement" as illustrated in FIG. 11A, the topmost point of the polyhedron may be the center of a face SD as illustrated in FIG. 12A. In the case of a polyhedron being disposed in the "vertex placement" as illustrated in FIG. 11B, the topmost point of the polyhedron may be a point PT as illustrated in FIG. 12B. In the case of a polyhedron being disposed in the "edge placement" as illustrated in FIG. 11C, the topmost point of the polyhedron may be the center of an edge SI as illustrated in FIG. 12C.

By referring to FIG. 10 again, pressing a sixth button BT6 on the second setting screen PN2 causes the "face placement" to be selected. Pressing a seventh button BT7 causes the "vertex placement" to be selected. Pressing an eighth button BT8 causes the "edge placement" to be selected.

By referring to FIG. 8 again, in step S105, the PC 2 checks whether a placement position has been selected. Upon determining that a placement position has been selected (YES in step S105), the PC 2 proceeds to step S106. Upon determining that a placement position has not been selected (NO in step S105), the PC 2 proceeds to step S104.

<Example of Coordinate Conversion>

In step S106, the PC 2 converts coordinates. For example, the PC 2 calculates two-dimensional coordinates in a captured image corresponding to three-dimensional coordinates as described in the following. In the following, three-dimensional coordinates are expressed as (X, Y, Z), and two-dimensional coordinates in a captured image is expressed as (x, y. The Z axis coincides with the vertical direction, i.e., the direction of gravity. The Y axis represents the depth direction. The X axis represents a direction perpendicular to the depth direction and to the vertical direction.

Figure 13:
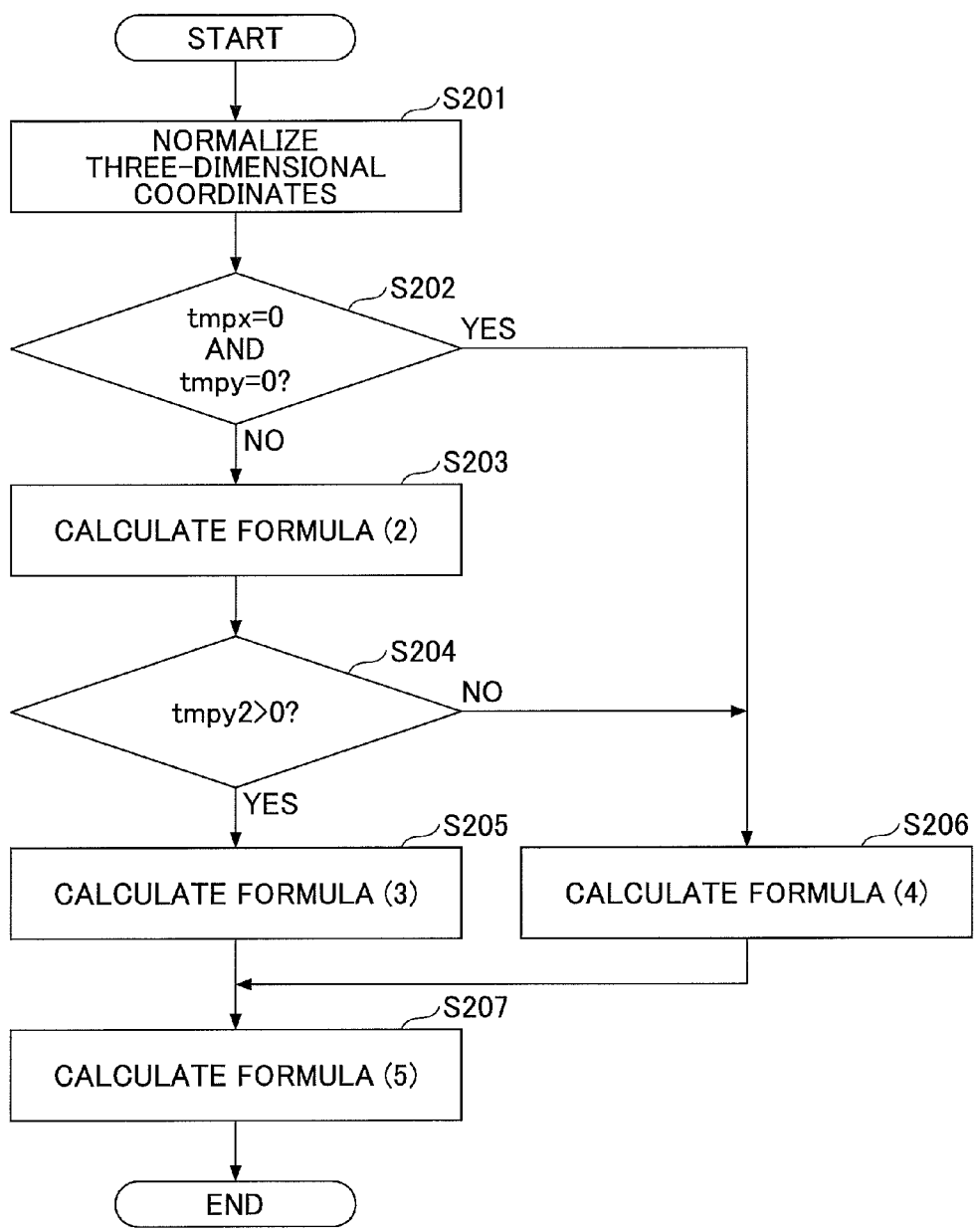
FIG. 13 is a flowchart illustrating an example of a conversion process performed by the image processing apparatus according to the embodiment.

In step S201 in FIG. 13, the PC 2 normalizes three-dimensional coordinates. For example, the PC 2 normalizes three-dimensional coordinates (X, Y, Z) by use of the following formula (1).

$$tmpx = \frac{X}{\sqrt{X^2 + Y^2 + Z^2}} \quad (1)$$

$$tmpy = \frac{Y}{\sqrt{X^2 + Y^2 + Z^2}}$$

$$tmpz = \frac{Z}{\sqrt{X^2 + Y^2 + Z^2}}$$

In this formula (1), normalized X, Y, and Z are denoted as tmpx, tmpy, and tmpz, respectively.

The PC 2 then performs step S202 based on the X coordinate and the Y coordinate, i.e., (tmpx, tmpy), among the normalized three-dimensional coordinates.

In step S202, the PC 2 checks whether the conditions of tmpx=0 and tmpy=0 are satisfied. Upon determining that both tmpx=0 and tmpy=0 are satisfied (YES in step S202), the PC 2 proceeds to step S206. Upon determining that at least one of tmpx=0 and tmpy=0 is not satisfied (NO in step S202), the PC 2 proceeds to step S203.

In step S203, the PC 2 performs calculation by use of the following formula (2).

$$tmpx2 = \frac{tmpx}{\sqrt{tmpx^2 + tmpy^2}} \quad (2)$$

$$tmpy2 = \frac{tmpy}{\sqrt{tmpx^2 + tmpy^2}}$$

In step S204, the PC 2 checks whether tmpy2 is greater than 0. Upon determining that tmpy2 is greater than 0 (YES in step S204), the PC 2 proceeds to step S205. Upon determining that tmpy2 is not greater than 0 (NO in step S204), the PC 2 proceeds to step S206.

In step S205, the PC 2 performs calculation by use of the following formula (3).

$$x = \frac{\cos^{-1}(tmpx2)}{\pi} \times \frac{width}{2} \quad (3)$$

In step S206, the PC 2 performs calculation by use of the following formula (4). When step S206 is to be performed upon selecting "YES" in step S202, tempx2 has not been calculated by use of the formula (2). In such a case, the PC 2 performs calculation by use of the following formula (4) by treating tmpx as tmpx2 (i.e., tmpx2=tmpx).

$$x = \frac{2\pi - \cos^{-1}(tmpx2)}{2\pi} \times width \quad (4)$$

In this manner, the PC 2 calculates "x" of the two-dimensional coordinates by use of the above-noted formula (3) or (4).

In step S207, the PC 2 performs calculation by use of the following formula (5).

$$y = \frac{\cos^{-1}(tmpz)}{\pi} \times height \quad (5)$$

In the above-noted formulas (3), (4), and (5), the "width" represents the size of a captured image in the width direction thereof, i.e., in the x-axis direction. Further, the "height" represents the size of the captured image in the height direction thereof, i.e., in the y-axis direction.

Through the calculations described above, the PC 2 converts three-dimensional coordinates (X, Y, Z) into two-dimensional coordinates (x, y). In this manner, the PC 2 identifies two-dimensional coordinates (x, Y) in the captured image with respect to an image point at three-dimensional coordinates (X, Y, Z) on a polyhedron.

By referring to FIG. 8 again, in step S107, the PC 2 performs a print process based on an output image. The output image generated herein is as follows, for example.

FIG. 14 is a drawing illustrating an example of a display screen showing an output image according to the embodiment. A display screen PN3 is a print preview screen or the like.

As illustrated in FIG. 14, the output image is generated in the form of a development drawing. This illustrated development shows an example in which a hexahedron is constructed by cutting the printed image from a paper sheet and folding the printed image. The output image displayed on the display screen PN3 is transmitted to the printer 3 (see FIG. 1), thereby forming (printing) an image corresponding to the illustrated development on a paper sheet or the like.

The PC 2 generates an output image representing a development by use of data as follows.

<Example of Data Structure>

The PC 2 has a data table prepared in advance as in TABLE 1 shown below.

TABLE 1

| FACE SHAPE | FACE COUNT | SHAPE ID | SHAPE NAME | SHAPE IMAGE |
|---|---|---|---|---|
| 3 | 4 | 001 | TETRAHEDRON | 4_men.jpg |
| 4 | 6 | 002 | HEXAHEDRON | 6_men.jpg |
| . | . | . | . | . |
| . | . | . | . | . |
| . | . | . | . | . |

The table data of TABLE 1 specifies types of polyhedrons registered in the PC 2. Among these shapes registered in TABLE 1, the user selects a polyhedron type on the first setting screen PN1 illustrated in FIG. 9. In TABLE 1, the "face shape" indicates the shape of each face of a polyhedron. For example, the "face shape" being 3 indicates triangle, and the "face shape" being 4 indicates a quadrilateral. The "face count" indicates the number of faces appearing in a development drawing. The "shape ID" is a number or the like that identifies each shape specified in TABLE 1. The "shape name" shows a general name of each shape. The "shape image" indicates the name of a file containing an image of a shape.

Each shape specified in TABLE 1 is associated with vertexes specified in TABLE 2 shown below, for example.

TABLE 2

| VERTEX ID | VERTEX NO. | SHAPE ID | COORDINATES |
|---|---|---|---|
| 001 | 1 | 001 | $(X_0, Y_0, Z_0)$ |
| 002 | 2 | 001 | . |
| | | | . |
| | | | . |
| 003 | 3 | 001 | . |
| | | | . |
| | | | . |
| 004 | 4 | 001 | . |
| | | | . |
| | | | . |
| 005 | 1 | 002 | . |
| | | | . |
| | | | . |
| 006 | 2 | 002 | . |
| | | | . |
| | | | . |
| . | . | . | . |
| . | . | . | . |
| . | . | . | . |

TABLE 2 provides a correspondence between the vertexes of each polyhedron specified in TABLE 1 and three-dimensional coordinates of these vertexes. The table data of TABLE 2 are stored in the PC 2 in advance. In TABLE 2, the "vertex ID" is a number or the like that identifies each vertex. The "vertex No." is a number that identifies each one of the vertexes of each shape. The "shape ID" is a number or the like that identifies each shape specified in TABLE 1. The "coordinates" show the three-dimensional coordinates of each vertex. In the example shown in TABLE 2, the rows for which the "shape ID" is "001" correspond to the entry in TABLE 1 for which the "shape ID" is "001". Namely, the rows for which the "vertex ID" is "001" through "004" in TABLE 2 indicate the vertexes of a tetrahedron In this case, thus, the number of data items representing vertexes is equal to four.

Placement positions are determined based on the table data of TABLE 3 shown below, for example.

TABLE 3

| SHAPE ID | PLACEMENT ID | PLACEMENT NAME | COORDINATES OF TOPMOST POINT | PLACEMENT IMAGE |
|---|---|---|---|---|
| 002 | 001 | FACE PLACEMENT | (X, Y, Z) | 6_yuka.jpg |
| 002 | 002 | VERTEX PLACEMENT | . | 6_bura.jpg |
| 002 | 003 | EDGE PLACEMENT | . | 6_case.jpg |
| . | . | . | . | . |
| . | . | . | . | . |
| . | . | . | . | . |

TABLE 3 specifies placement positions with respect to each shape specified in TABLE 1. The table data of TABLE 3 are stored in the PC 2 in advance. The "shape ID" in TABLE 3 is a number or the like that identifies each shape specified in TABLE 1. The "placement ID" is a number specifying the type of a placement position. The "placement name" indicates the name of each placement position. The "coordinates of topmost point" represent the coordinates of a topmost point defined for each placement position in which the polyhedron is placed according to the "placement ID". The "placement image" indicates the name of a file containing an image showing a placement position. Based on TABLE 3, the second setting display PN2 is displayed as illustrated in FIG. 10. In this example, TABLE 3 has entries for three types of placement positions, i.e., "face placement", "vertex placement", and "edge placement". Accordingly, these three types of placement positions are selectable on the second setting screen PN2. The "coordinates of topmost point" in TABLE 3 are converted into two-dimensional coordinates in a captured image through the process illustrated in FIG. 13.

The faces of each development and the vertexes of each face are determined for each shape based on the table data of TABLE 4 as shown below, for example. The table data of TABLE 4 are stored in the PC 2 in advance.

TABLE 4

| SHAPE ID | FACE NO. | FACE-VERTEX NO. | COORDINATES |
|---|---|---|---|
| 001 | 1 | 1 | (x, y) |
| 001 | 1 | 2 | . |
| 001 | 1 | 3 | . |
| 001 | 2 | 1 | . |
| 001 | 2 | 2 | . |
| 001 | 2 | 3 | . |
| 001 | 3 | 1 | . |
| 001 | 3 | 2 | . |
| 001 | 3 | 3 | . |
| 001 | 4 | 1 | . |
| 001 | 4 | 2 | . |
| 001 | 4 | 3 | . |
| . | . | . | . |
| . | . | . | . |
| . | . | . | . |

The table data of TABLE 4 provides a correspondence between a shape as defined in TABLE 1 and the faces of each polyhedron of such a shape. The case of the "shape ID" being "001", for example, corresponds to the polyhedron type that is a tetrahedron as shown in TABLE 1. In the case of a tetrahedron, a polyhedron has four faces. TABLE 4 thus uses the "face No." that is "1" through "4" to specify the faces of the tetrahedron. Namely, the four faces of a tetrahedron are each given a different "face No." in TABLE 4.

In this manner, the "shape ID" in TABLE 4 corresponds to the "shape ID" specified in TABLE 1. The "face No." is a number or the like that identifies each face of a polyhedron. The "face vertex No." is a number or the like that identifies the vertexes of each face. In the case of a tetrahedron, each face is a triangle, and has three vertexes. In TABLE 4, thus, each face has three "face vertex No." entries assigned thereto. The "coordinates" show the two-dimensional coordinates of each vertex in a development.

Each vertex of each polyhedron has the two-dimensional coordinates associated with the three-dimensional coordinates according to table data as in TABLE 5 shown below.

TABLE 5

| SHAPE ID | FACE NO. | FACE-VERTEX NO. | VERTEX NO. |
|---|---|---|---|
| 001 | 1 | 1 | 1 |
| 001 | 1 | 2 | 2 |
| 001 | 1 | 3 | 3 |
| 001 | 2 | 1 | 1 |
| 001 | 2 | 2 | 2 |
| 001 | 2 | 3 | 4 |
| . | . | . | . |
| . | . | . | . |
| . | . | . | . |

The table data of TABLE 5 provides a correspondence between vertexes as defined in TABLE 4 and vertexes as defined in TABLE 2. To be more specific, TABLE 5 links a vertex identified by "face vertex No." with a vertex identified by "vertex No." The "face vertex No." is a number or the like in TABLE 4 that identifies two-dimensional coordinates, i.e., coordinates in a development drawing. On the other hand, the "vertex No." is a number or the like in TABLE 2 that identifies three-dimensional coordinates on a constructed polyhedron.

By use of these data, the image processing apparatus finds a match between three-dimensional coordinates on a constructed polyhedron and two-dimensional coordinates on a development. The conversion process illustrated in FIG. 13 provides a correspondence between three-dimensional coordinates and coordinates in a captured image. The image processing apparatus is thus able to identify the coordinates in the captured image with respect to an image point that is to be formed in the coordinate system of the development.

More specifically, the image processing apparatus first determines whether a point of interest on a two-dimensional plane on which a development is to be formed falls within the boundaries of a development. TABLE 4 provides two-dimensional coordinates of the vertexes of each face that constitutes the development. The image processing apparatus can thus determine whether the point of interest on the plane is situated within the boundaries of any given face of the development. For any point inside the boundaries of the development, the image processing apparatus needs to acquire the three-dimensional coordinates of this point on the polyhedron constructed by folding the development.

In order to do so, the image processing apparatus may identify a face in which this point is situated on the two-dimensional plane, followed by interpolating this point within the identified face. For example, the position of this point may be expressed on the plane as a weighted sum of two vectors that extend from a given start-point vertex of the identified face toward the two adjacent vertexes of this face. With respect to these three vertexes (i.e., one start-point vertex and two endpoint vertexes) on the two-dimensional plane, the image processing apparatus may identify three corresponding vertexes in three-dimensional space and the three-dimensional coordinates thereof by use of TABLE 4, TABLE 5, and TABLE 2. The image processing apparatus can thus find two vectors in the three-dimensional space that correspond to the two noted vectors on the two-dimensional plane. In the three-dimensional space, the image processing apparatus may then identify the three-dimensional coordinates of the point of interest as the end point of a weighted sum of the two corresponding vectors extending from the start-point vertex.

When the three-dimensional coordinates of the topmost point for the selected placement position are different from (0, 0, Z1) (Z1: any proper value), the image processing apparatus may need to correct the three-dimensional coordinates of the point of interest through three-dimensional rotational transformation. This rotational transformation is defined as rotation around an axis perpendicular to both the vector from the origin to the topmost point and the vector from the origin to (0, 0, Z1) such as to bring the topmost point to (0, 0, Z1). Here, the origin is positioned at the center of the polyhedron.

The image processing apparatus may obtain such a rotation axis by calculating the outer product between the vector from the origin to the topmost point and the vector from the origin to (0, 0, Z1). The angle of rotation to bring the topmost point to (0, 0, Z1) may be obtained by calculating the inner product between these two vectors. In this manner, the image processing apparatus is able to identify rotational transformation that brings the topmost point to (0, 0, Z1). The image processing apparatus applies the same rotational transformation to the three-dimensional coordinates of the point of interest in order to perform zenith correction.

Finally, the image processing apparatus performs the calculations illustrated in FIG. 13 to identify the two-dimensional coordinates of the point of interest in the captured image. In this manner, the image processing apparatus converts the coordinates of a point in the captured image into the coordinates of the corresponding point in the development with proper zenith correction.

It should be noted that the three-dimensional coordinates as provided in TABLE 2 may be provided with respect to each different placement position of each polyhedron. For example, TABLE 2 may list the three-dimensional coordinates of vertexes of a tetrahedron placed in the face placement, the three-dimensional coordinates of vertexes of a tetrahedron placed in the point placement, and three-dimensional coordinates of vertexes of a tetrahedron placed in the edge placement. In such a case, there is no need to perform rotational transformation as described above to make a zenith correction. It suffices for the image processing apparatus to use the three-dimensional coordinates corresponding to the selected placement position in order to find proper three-dimensional coordinates of the previously-noted point of interest.

<Variation 1>

The shape of a development may be selected by a user as follows.

Figure 15B:
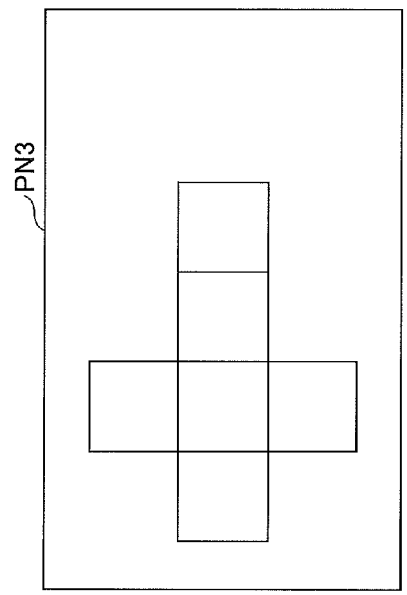
FIGS. 15A through 15C are drawings illustrating an example of a display screen for selecting a development according to the embodiment.
Figure 15C:
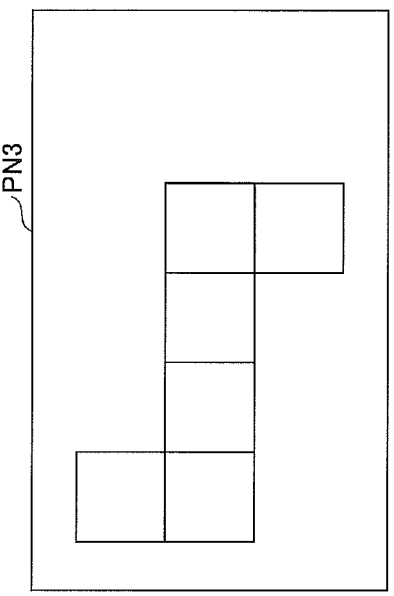
Figure 15A:
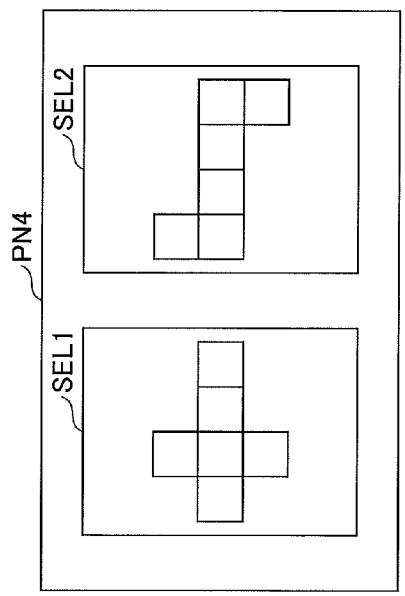

FIGS. 15A through 15C are drawings illustrating an example of a display screen for selecting a development according to the embodiment. The PC 2 may display a selecting screen PN4 as illustrated in FIG. 15A. Specifically, the selecting screen PN4 is an example of a selecting screen that allows a user to select a development for a hexahedron.

As illustrated in FIG. 15A, the selecting screen PN4 allows a development drawing to be selected among a first choice SEL1 and a second choice SEL2. For example, selecting the first choice SEL1 on the selecting screen PN4 through a user operation causes a display screen PN3 serving as a print preview screen to be displayed as illustrated in FIG. 15B. Selecting the second choice SEL2 on the selecting screen PN4 through a user operation causes the display screen PN3 serving as a print preview screen to be displayed as illustrated in FIG. 15C. In this manner, the user is allowed to select a type of a development even when a polyhedron to be printed is of the same type.

<Variation 2>

The PC 2 may be configured such that a predetermined image different from a captured image is printed on a given face according to a user setting. The following example will be directed to a case in which a QR code (registered trademark) serving as an example of the predetermined image is printed.

Figure 16B:
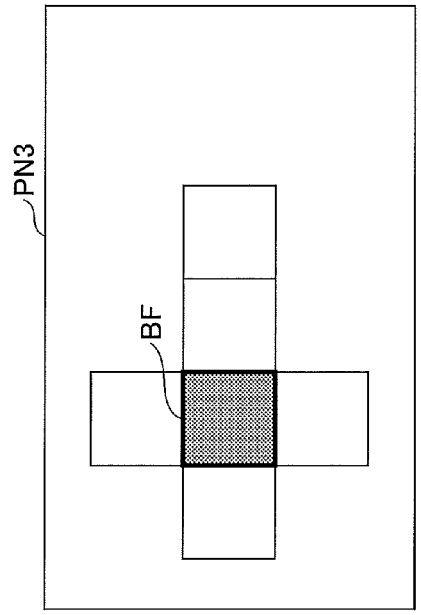
FIGS. 16A through 16C are drawings illustrating an example of a display screen for setting an image according to the embodiment.
Figure 16C:
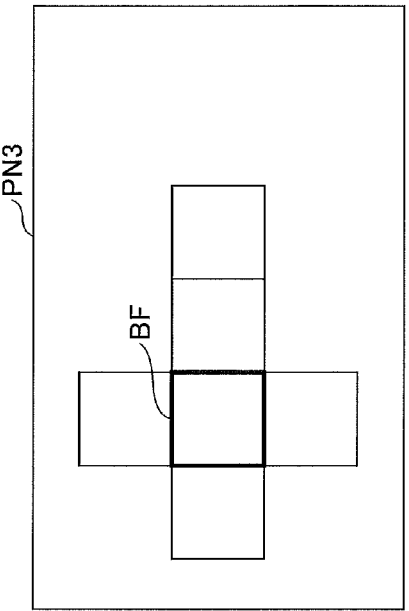
Figure 16A:
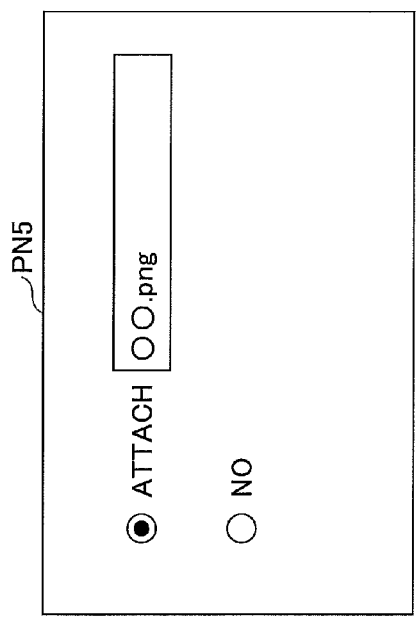

FIGS. 16A through 16C are drawings illustrating an example of a display screen for setting an image according to the embodiment. The PC 2 displays an image setting screen PN5 as illustrated in FIG. 16A, for example. In this example, selecting "attach" through a user operation causes an image having an entered file name to be printed on a given face of a development. Selecting "no" through a user operation causes every face of the development to have a corresponding portion of the captured image printed thereon.

The given face may preferably be a bottom face BF. Namely, an image such as a QR code (registered trademark) is preferably printed on the bottom face BF as illustrated in FIG. 16B. An image on the bottom face BF is concealed when the polyhedron is placed on the floor. Accordingly, an image such as a QR code (registered trademark) is preferably formed on the bottom face BF, and is preferably concealed when placed on the floor. The user may alternatively select the above-noted given face.

Selecting "no" on the image setting screen PN5 illustrated in FIG. 16A causes the bottom face BF to have a portion of the captured image printed thereon similarly to the other faces, as illustrated in FIG. 16C. The predetermined image is not limited to a QR code (registered trademark), and may be another image or code, for example.

<Variation 3>

The development drawing may be provided with tabs for use in gluing at the time of folding and constructing, i.e., provided with glue tabs.

Figure 17B:
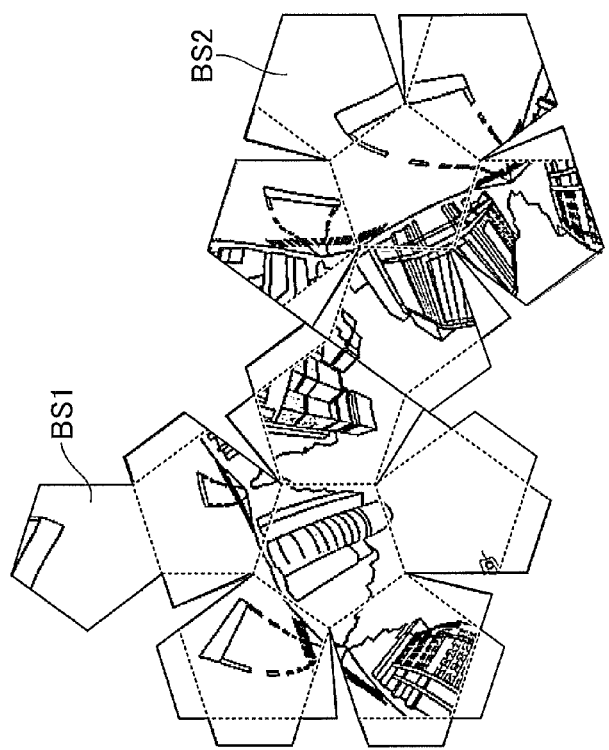
FIGS. 17A and 17B are drawings illustrating examples of output images according to the embodiment.
Figure 17A:
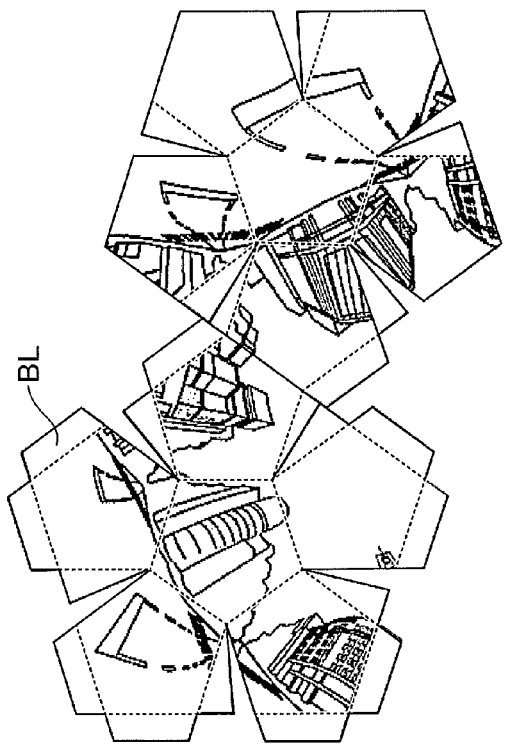

FIGS. 17A and 17B are drawings illustrating examples of output images according to the embodiment. The development shown in FIGS. 17A and 17B is directed to an example in which the captured image illustrated in FIG. 4C is used. The development in this example is folded to construct a dodecahedron.

The output image illustrated in FIG. 17A shows an example in which some sides of the faces have glue tabs BL attached thereto. A user cuts the development from a paper sheet or the like, and glues the faces to each other to construct a polyhedron. The provision of the glue tabs BL as shown in this example for the purpose of gluing faces allows a sufficient area to be provided for applying adhesive or glue thereto for bonding purposes.

The output image illustrated in FIG. 17B shows an example in which a first face BS1 serving as an example of a glue face is provided. In this example, the first face BS2 has the same image printed thereon as the image on a second face BS2. The first face BS1 overlaps the second face BS2 upon a polyhedron being constructed. Namely, the first face BS1 overlaps the second face BS2 at the time of construction to complete a polyhedron. The provision of a face such as the first face BS1 makes construction easier. The shape of the first face BS1 is not limited to the illustrated shape, and may have a shape with half the area size of the face, for example.

The provision of tabs or faces for bonding purposes as described above allows the image processing apparatus to produce an output image representing a development that is easy to construct. Further, tabs or faces may be formed on a development so as to serve as a handling portion of a polyhedron.

<Variation 4>

The image forming apparatus may reduce the size of, or make a parallel shift of, a captured image as described in the following, for example.

FIG. 18 is a drawing illustrating an example of size reduction of a captured image according to the embodiment. In the following, a description will be given of an example in which the image illustrated in FIG. 4C is transmitted to the PC 2. In this example, an input image IMG1 is the same as the image illustrated in FIG. 4C. The image processing apparatus reduces the size of the input image IMG1 into a reduced image IMG2 as illustrated in FIG. 18.

As illustrated in FIG. 18, the reduced image IMG2 is made by reducing the input image IMG1 in the vertical direction (i.e., along the y axis). The use of the reduced image IMG2 made by reducing the size of the captured image in the vertical direction results in a blank area BLS being created in the captured image. In the case of a tetrahedron being in the "face placement" position as illustrated in FIG. 11A, for example, the blank area BLS is placed at the bottom face BF. Accordingly, reduction as described above allows all the objects or the like appearing in the captured image to be shown on the faces other than the bottom face BF. The image processing apparatus is thus able to produce an output image such that all the objects or the like appearing in the captured image are printed on the viewable areas on the constructed polyhedron.

The image processing apparatus may make a parallel shift of a captured image as described in the following.

FIG. 19 is a drawing illustrating an example of a parallel shift of a captured image according to the embodiment. In the following, a description will be given of an example in which the image illustrated in FIG. 4C is transmitted to the PC 2 similarly to the case illustrated in FIG. 18. The image processing apparatus makes a parallel shift of the input image IMG1 to produce a parallel-shift image IMG3 as illustrated in FIG. 19. An upper portion of the input image IMG1 close to the zenith (i.e., an upper portion of the input image IMG1 in FIG. 19) may have no objects of interest, and may only show a scenery of sky or the like. In such a case, the upper portion could be omitted from the image formed on a polyhedron.

In consideration of this, the image processing apparatus makes a parallel shift of the input image IMG1 toward the zenith to produce the parallel-shift image IMG3 as illustrated in FIG. 19. Making a parallel shift as described above causes the upper portion of the input image IMG1 to be removed from the parallel-shift image IMG3, and also causes a blank area BLS to be created beneath the parallel-shift image IMG3 similarly to the case shown in FIG. 18.

In this manner, the image processing apparatus is able to produce an output image such that the objects of interest or the like appearing in the captured image are printed in the viewable areas of a constructed polyhedron.

In other cases, a predetermined object may appear in a lower portion of an input image. In the case of an omnidirectional camera being used for an image capture, a finger or the like of a user may be captured as a predetermined object. It may be noted that the image processing apparatus is able to detect a predetermined object such as a finger by checking whether a flesh color occupies more than a predetermined area size, for example. In the case of a predetermined object appearing in the lower portion of an input image as described above, the image processing apparatus may reduce the size of, or make a parallel shift of, the image such that the predetermined object is printed on the bottom face.

<Variation 5>

The coordinates of a zenith may be selected in a captured image. In the following, a description will be given of an example in which the image illustrated in FIG. 4C is transmitted to the PC 2. The image processing apparatus may perform a process as described in the following, for example.

Figure 20:
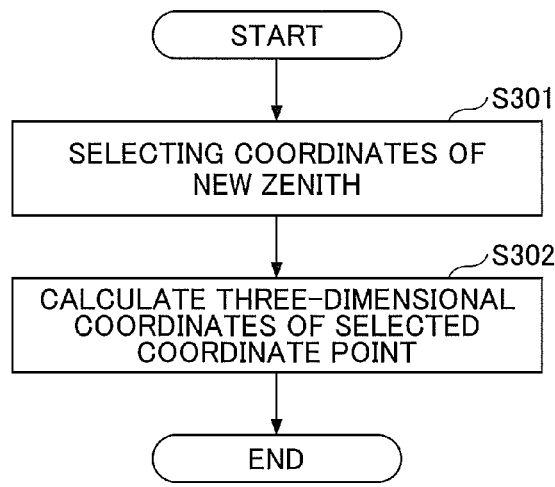
FIG. 20 is a flowchart illustrating an example of the process of changing the coordinates of a zenith performed by the image processing apparatus according to the embodiment.

FIG. 20 is a flowchart illustrating an example of the process of changing the coordinates of a zenith performed by the image processing apparatus according to the embodiment.

In step S301, the PC 2 selects the coordinates of a new zenith. In the following, a description will be given of the method of selecting coordinates with reference to a drawing.

Figure 21:
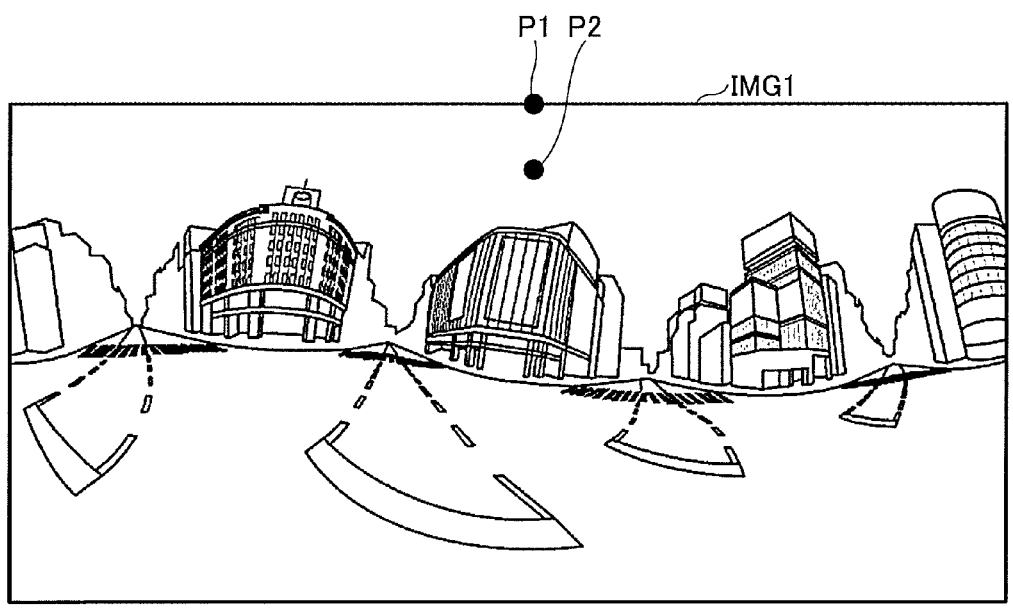
FIG. 21 is a drawing illustrating an example of selecting the coordinates of a zenith in a captured image according to the embodiment.

FIG. 21 is a drawing illustrating an example of selecting the coordinates of a zenith in a captured image according to the embodiment. As illustrated in FIG. 21, the coordinates of a zenith may initially indicate a first coordinate point P1 in the input image IMG1, for example. Namely, the first coordinate point P1 is an initial value. Upon a selection being made by a user operation or the like, the coordinates of a zenith may be changed. Specifically, the user may select a second coordinate point P2, for example. As a result, this second coordinate point P2 is treated as a new zenith. To be more specific, the PC 2 performs the following processing.

By referring to FIG. 20 again, in step S302, the PC 2 calculates the three-dimensional coordinates of a selected coordinate point. For example, the PC 2 calculates the three-dimensional coordinates of a selected coordinate point by use of the following formula (6).

$$X = \cos\left(\frac{x}{\text{width}} \times 2\pi\right) \times \cos\left(\frac{(2y - \text{height}) \times \pi}{2 \times \text{height}}\right)$$
$$Y = \sin\left(\frac{x}{\text{width}} \times 2\pi\right) \times \cos\left(\frac{(2y - \text{height}) \times \pi}{2 \times \text{height}}\right)$$
$$Z = \sin\left(\frac{(2y - \text{height}) \times \pi}{2 \times \text{height}}\right)$$

(6)

In the above-noted formula (6), the "width" represents the size of a captured image in the width direction thereof, i.e., in the x-axis direction, similarly to the case in the formulas (3), (4), and (5). Further, the "height" represents the size of the captured image in the height direction thereof, i.e., in the y-axis direction. Further, (x, y) represents the two-dimensional coordinates of the selected point in the captured image. Three-dimensional coordinates (X, Y, Z) calculated by use of the formula (6) then serve as the coordinates of a new zenith specified by (x, y).

After the processes described above, the PC is able to treat the coordinates of a point selected by the user in the captured image as the zenith of the captured image.

<Example of Functional Configuration>

Figure 22:
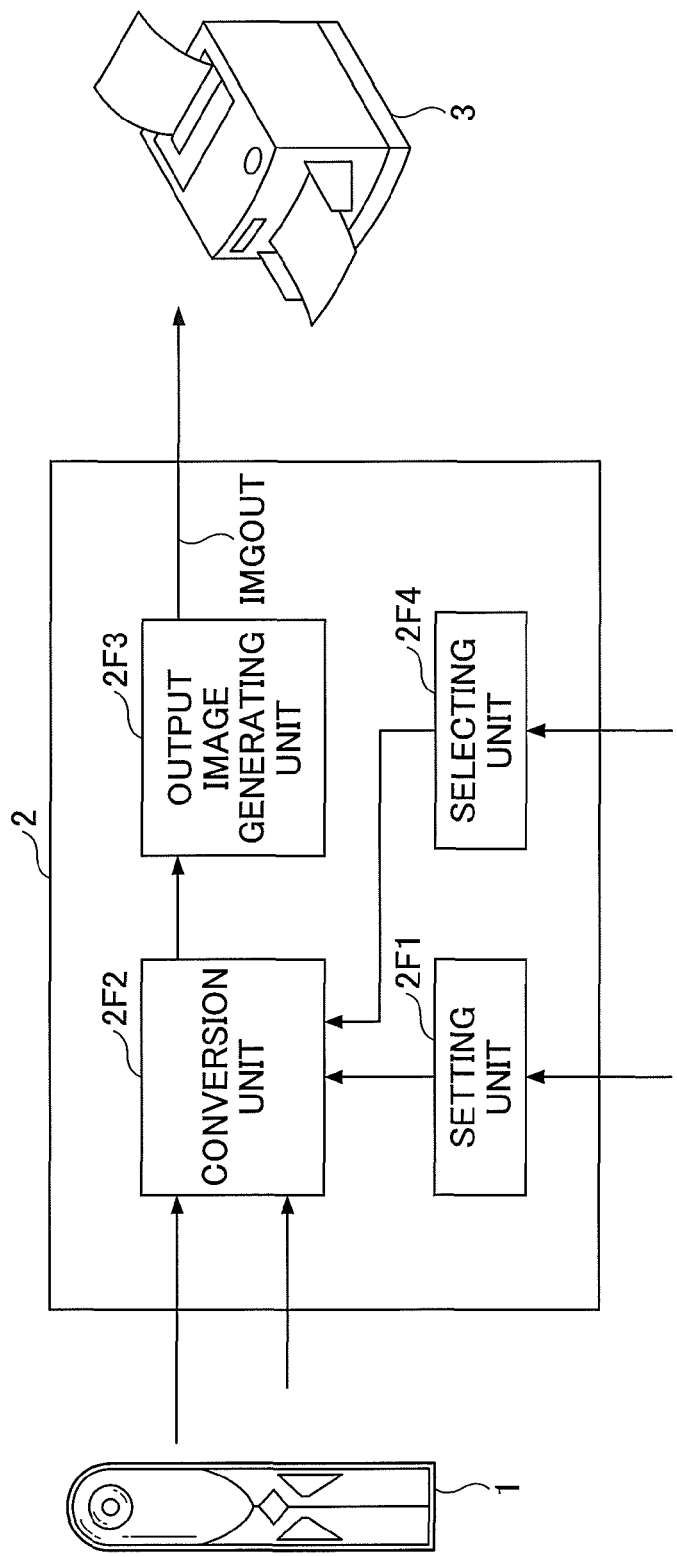
FIG. 22 is a functional block diagram illustrating an example of the functional configuration of the image processing apparatus according to the embodiment.

FIG. 22 is a functional block diagram illustrating an example of the functional configuration of the image processing apparatus according to the embodiment. The PC 2 includes a setting unit 2F1, a conversion unit 2F2, and an output image generating unit 2F3, for example. As illustrated in FIG. 22, further, the PC 2 may preferably have a functional configuration further including a selecting unit 2F4.

The setting unit 2F1 serves to set a type of a polyhedron. The setting unit 2F1 may be implemented by use of the input device 2H3 (see FIG. 6) or the like, for example.

The conversion unit 2F2 converts coordinates in a captured image into coordinates in a development that is printed on a medium and folded to construct a polyhedron such that a zenith in the captured image is printed at the position of a topmost point of the polyhedron constructed by folding the development printed on the medium. The conversion unit 2F2 may be implemented by use of the CPU 2H5 (see FIG. 6) or the like, for example.

The output image generating unit 2F3 generates an output image IMGOUT based on the coordinates converted by the conversion unit 2F2. The output image generating unit 2F3 may be implemented by use of the CPU 2H5 (see FIG. 6) or the like, for example.

The selecting unit 2F4 serves to select (specify) the coordinates of a new zenith. The selecting unit 2F4 may be implemented by use of the input device 2H3 (see FIG. 6) or the like, for example.

The development is a drawing that is folded into a polyhedron. There are many types of polyhedrons, and polyhedrons are placed in various placement positions. The PC 2 uses the setting unit 2F1 to display a setting screen that allows a user to select a type of a polyhedron and a placement position of a polyhedron as illustrated in FIG. 9 and FIG. 10, for example. With such a setting screen, the user is able to select a type of a polyhedron and a placement position of a polyhedron as settings made in the PC 2.

As illustrated in FIGS. 12A through 12C, for example, the position of a topmost point of a polyhedron varies depending on the type and placement position of the polyhedron. In consideration of this, the PC 2 stores the coordinates of a topmost point with respect to each polyhedron type and each placement position in advance as shown in TABLE 3, for example. With this arrangement, the PC 2 is able to utilize information about the three-dimensional coordinates of a topmost point with respect to each polyhedron type and each placement position.

Moreover, the PC 2 is able to use the process by the conversion unit 2F2, e.g., the process illustrated in FIG. 13, to convert the three-dimensional coordinates of a topmost point into two-dimensional coordinates in a captured image. Namely, the PC 2 is able to place a desired pixel of the captured image on the polyhedron by use of the process illustrated in FIG. 13. As a result, the PC 2 is able to generate the output image IMGOUT such that the zenith of the captured image is placed at the topmost point of the polyhedron.

The output image IMGOUT is used to produce an image of a development on a medium. The PC 2 is able to produce the output image IMGOUT by finding a match between two-dimensional coordinates in the development and three-dimensional coordinates in accordance with TABLE 5, for example. In this manner, the PC 2 produces an output image such that a polyhedron constructed by folding a paper sheet or the like having a captured image printed thereon has the topmost point thereof corresponding to the zenith of the captured image.

The functional configuration that includes the selecting unit 2F4 allows the coordinates of a new zenith to be selected as illustrated in FIG. 20 and FIG. 21, for example.

Other Embodiments

The embodiment of the present invention may be implemented by use of programs written in programming languages or the like. Namely, the embodiment of the present embodiment may be implemented as a program for causing a computer such as an image processing apparatus to perform an image processing method. Such a program may be stored and distributed in a computer-readable recording medium such as a flash memory, an SD (registered trademark) card, an optical disk, or the like. The program may also be distributed through electrical communication lines such as the Internet.

In the embodiment of the present invention, part or all of the processing may alternatively be implemented by use of a programmable device (PD) such as a field-programmable gate array (FPGA), for example. In the embodiment of the present invention, further, part or all of the processing may alternatively be implemented by use of an ASIC (application specific integrated circuit).

According to at least one embodiment, an image processing apparatus is provided for which a polyhedron produced by folding a paper sheet or the like having a captured image printed thereon has the topmost point thereof corresponding to the zenith of the captured image.

Although the preferred embodiments of the present invention have heretofore been described, the present invention is not limited to such particular embodiments. Various modifications and changes may be made without departing from the scope of the invention.

RELATED-ART DOCUMENTS

Patent Document

[Patent Document 1] Japanese Unexamined Patent Application Publication No. 2002-328959

What is claimed is:

1. An image processing apparatus for coupling to an imaging apparatus that generates a captured image covering substantially a 360-degree field of view and for transmitting an output image to an image forming apparatus, the image processing apparatus comprising:
a memory; and
a processor coupled to the memory and configured to perform functions of:
a setting unit configured to select a type of a polyhedron that is to be constructed by folding a development printed on a medium according to the output image;
a converter configured to perform a conversion process to convert two-dimensional coordinates in the captured image into two-dimensional coordinates in the development that is to be printed on the medium and folded to construct the polyhedron, such that a zenith in the captured image is printed at a topmost point of the polyhedron constructed by folding the development printed on the medium; and
an image generator configured to generate the output image based on the converted coordinates,
wherein the conversion process includes:
calculating conversion between the two-dimensional coordinates in the captured image and three-dimensional coordinates on the polyhedron to be constructed; and
calculating conversion between the three-dimensional coordinates on the polyhedron and the two-dimensional coordinates in the development, and
wherein the three-dimensional coordinates on the polyhedron vary in response to a placement position of the polyhedron.

2. The image processing apparatus according to claim 1, wherein the placement position of the polyhedron is specified in response to a user input, and the converter is configured to convert the two-dimensional coordinates in the captured image into the two-dimensional coordinates in the development in accordance with the placement position.

3. The image processing apparatus according to claim 2, wherein the placement position is selectable from placement positions, the placement positions including a placement position in which one of a plurality of faces of the polyhedron is in contact with a ground, a placement position in which one of a plurality of vertexes of the polyhedron is in contact with the ground, and a placement position in which one of a plurality of edges of the polyhedron is in contact with the ground.

4. The image processing apparatus according to claim 1, wherein the converter uses data that provides a correspondence between three-dimensional coordinates of vertexes of the polyhedron and two-dimensional coordinates of the vertexes in the development.

5. The image processing apparatus according to claim 1, wherein a predetermined image different from the captured image is printed on one of a plurality of faces of the polyhedron.

6. The image processing apparatus according to claim 1, wherein the development includes tabs or faces for use in bonding faces of the polyhedron.

7. The image processing apparatus according to claim 1, wherein the captured image is reduced in size to generate the output image such that an entirety of the captured image is printed on faces of the polyhedron other than a bottom face.

8. The image processing apparatus according to claim 1, wherein the captured image is reduced in size to generate the output image such that a predetermined object appearing in the captured image is printed on a bottom face of the polyhedron.

9. The image processing apparatus according to claim 1, wherein the captured image is subjected to a parallel shift to generate the output image such that an entirety of the captured image is printed on faces of the polyhedron other than a bottom face.

10. The image processing apparatus according to claim 1, further comprising a selecting unit configured to select coordinates of a point to become the zenith.

11. A method for processing an image in an image processing apparatus for coupling to an imaging apparatus that generates a captured image covering substantially a 360-degree field of view and for transmitting an output image to an image forming apparatus, the method comprising:
selecting a type of a polyhedron that is to be constructed by folding a development printed on a medium according to the output image;
performing a conversion process of converting two-dimensional coordinates in the captured image into two-dimensional coordinates in the development that is to be printed on the medium and folded to construct the polyhedron, such that a zenith in the captured image is printed at a topmost point of the polyhedron constructed by folding the development printed on the medium; and generating the output image based on the converted coordinates, wherein the conversion process includes:

calculating conversion between the two-dimensional coordinates in the captured image and three-dimensional coordinates on the polyhedron to be constructed; and calculating conversion between the three-dimensional coordinates on the polyhedron and the two-dimensional coordinates in the development, and wherein the three-dimensional coordinates on the polyhedron vary in response to a placement position of the polyhedron.

12. A non-transitory recording medium having a program recorded thereon for causing a computer to perform an image processing method, the computer being for coupling to an imaging apparatus that generates a captured image covering substantially a 360-degree field of view and for transmitting an output image to an image forming apparatus, the program comprising:

selecting a type of a polyhedron that is to be constructed by folding a development printed on a medium according to the output image;

performing a conversion process of converting two-dimensional coordinates in the captured image into two-dimensional coordinates in the development that is to be printed on the medium and folded to construct the polyhedron, such that a zenith in the captured image is printed at a topmost point of the polyhedron constructed by folding the development printed on the medium; and generating the output image based on the converted coordinates, wherein the conversion process includes:

calculating conversion between the two-dimensional coordinates in the captured image and three-dimensional coordinates on the polyhedron to be constructed; and calculating conversion between the three-dimensional coordinates on the polyhedron and the two-dimensional coordinates in the development, and wherein the three-dimensional coordinates on the polyhedron vary in response to a placement position of the polyhedron.

* * * * *